US012634227B2

(12) United States Patent
Yan et al.

(10) Patent No.: US 12,634,227 B2
(45) Date of Patent: May 19, 2026

(54) METHOD AND APPARATUS FOR TRANSMITTING VIRTUAL PRIVATE NETWORK SEGMENT IDENTIFIER VPN SID, AND NETWORK DEVICE

(71) Applicant: HUAWEI TECHNOLOGIES CO., LTD., Shenzhen (CN)

(72) Inventors: Zhaoyang Yan, Nanjing (CN); Haibo Wang, Beijing (CN); Xia Chen, Beijing (CN); Juan Zheng, Nanjing (CN); Shuying Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 477 days.

(21) Appl. No.: 18/171,195

(22) Filed: Feb. 17, 2023

(65) Prior Publication Data

US 2023/0208754 A1     Jun. 29, 2023

Related U.S. Application Data

(63) Continuation of application No. PCT/CN2021/106286, filed on Jul. 14, 2021.

(30) Foreign Application Priority Data

Aug. 18, 2020    (CN) .......................... 202010830252.2
Oct. 26, 2020    (CN) .......................... 202011158079.2

(51) Int. Cl.
| | | |
|---|---|---|
| *H04L 45/00* | (2022.01) | |
| *H04L 12/46* | (2006.01) | |
| *H04L 45/74* | (2022.01) | |

(52) U.S. Cl.
CPC .......... *H04L 45/34* (2013.01); *H04L 12/4641* (2013.01); *H04L 45/74* (2013.01)

(58) Field of Classification Search
CPC ..... H04L 45/34; H04L 12/4641; H04L 45/74; H04L 45/04; H04L 63/0272
See application file for complete search history.

(56) References Cited

U.S. PATENT DOCUMENTS

2020/0127913 A1*    4/2020    Filsfils .................. H04L 45/741

FOREIGN PATENT DOCUMENTS

| CN | 102356668 A | 2/2012 |
|---|---|---|
| CN | 110832813 A | 2/2020 |

(Continued)

*Primary Examiner* — Cheikh T Ndiaye

(74) *Attorney, Agent, or Firm* — Leydig, Voit & Mayer, Ltd.

(57) ABSTRACT

Embodiments of this application disclose a method and an apparatus for transmitting a virtual private network segment identifier (VPN SID), and a network device. An egress node sends a VPN SID corresponding to the egress node to each node in a network, and indicates to each node to store the VPN SID of the egress node. In this way, both an ingress node and each intermediate node can sense and store the VPN SID. When a VPN service needs to be provisioned, because each node stores the VPN SID of the egress node, it is possible for each node to associate the VPN SID with a forwarding entry of the VPN service to be provisioned in a forwarding table, to implement VPN route convergence. In addition, for a of a VPN corresponding to the VPN SID and that is sent by a user side, both the ingress node and the intermediate node can guide forwarding of the packet based on a locally stored VPN SID, to implement VPN service-level control.

20 Claims, 12 Drawing Sheets

(56)         References Cited

FOREIGN PATENT DOCUMENTS

| CN | 111092801 A | 5/2020 | |
| EP | 3836490 A1 * | 6/2021 | ......... H04L 12/4633 |
| WO | 2020029976 A1 | 2/2020 | |

* cited by examiner

In an intermediate system to intermediate system ISIS protocol packet, the following sub-TLV field is added to a type length value TLV 236:
(A prefix Prefix of internet protocol version 6 IPv6 is xx::xx/128)

| Type Type | Length Length | Segment identifier egress node behavior SID-Endpoint-Behavior (used to carry a VPN SID) |
|---|---|---|
| Algorithm Algorithm (carrying an identifier of a network topology) | ... | |

FIG. 3a

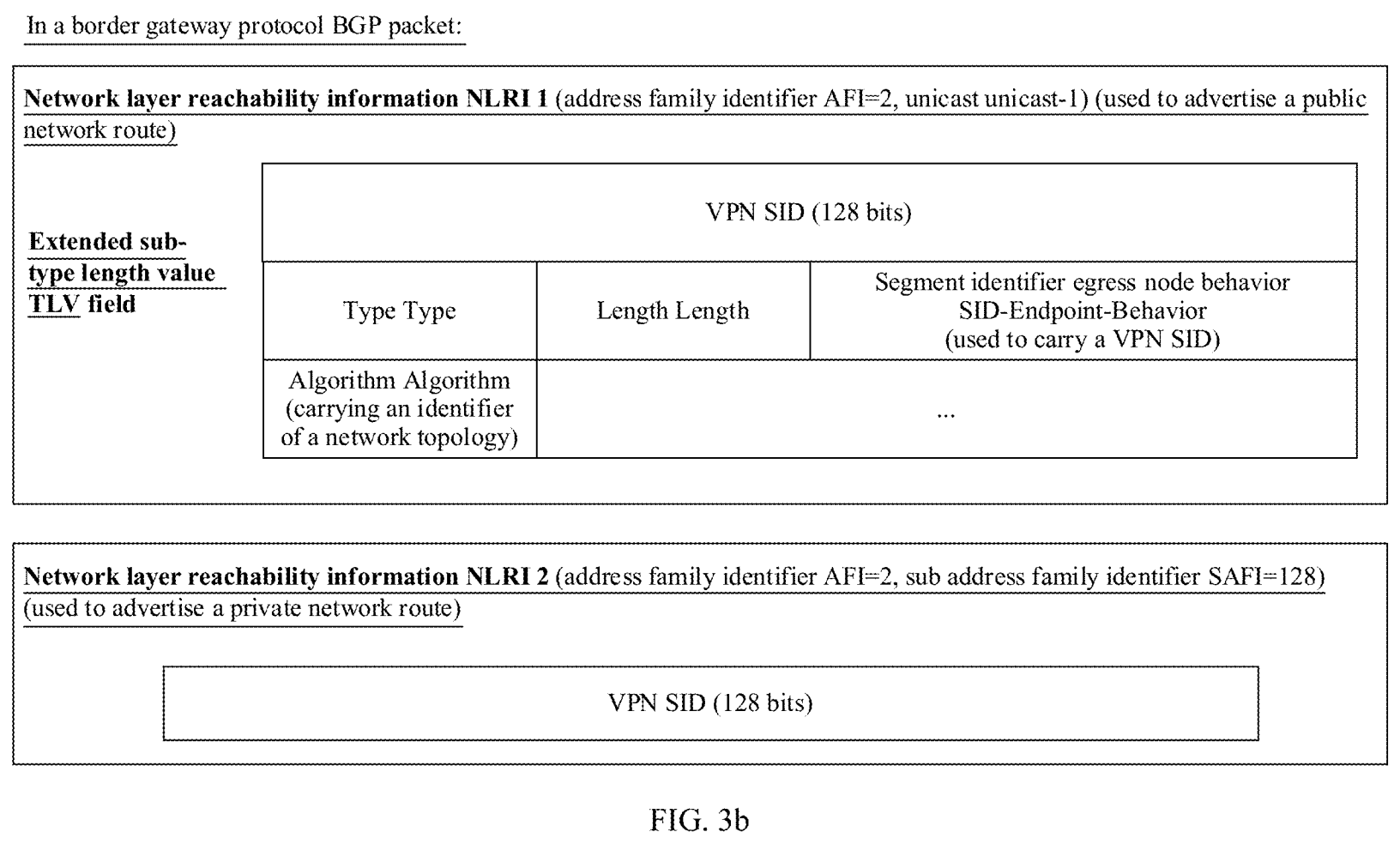

In a border gateway protocol BGP packet:

Network layer reachability information NLRI 1 (address family identifier AFI=2, unicast unicast-1) (used to advertise a public network route)

| Extended sub-type length value TLV field | | VPN SID (128 bits) | |
|---|---|---|---|
| | Length Length | | Segment identifier egress node behavior SID-Endpoint-Behavior (used to carry a VPN SID) |
| Type Type | | | |
| Algorithm Algorithm (carrying an identifier of a network topology) | | | ... |

Network layer reachability information NLRI 2 (address family identifier AFI=2, sub address family identifier SAFI=128) (used to advertise a private network route)

| VPN SID (128 bits) |
|---|
| |

FIG. 3b

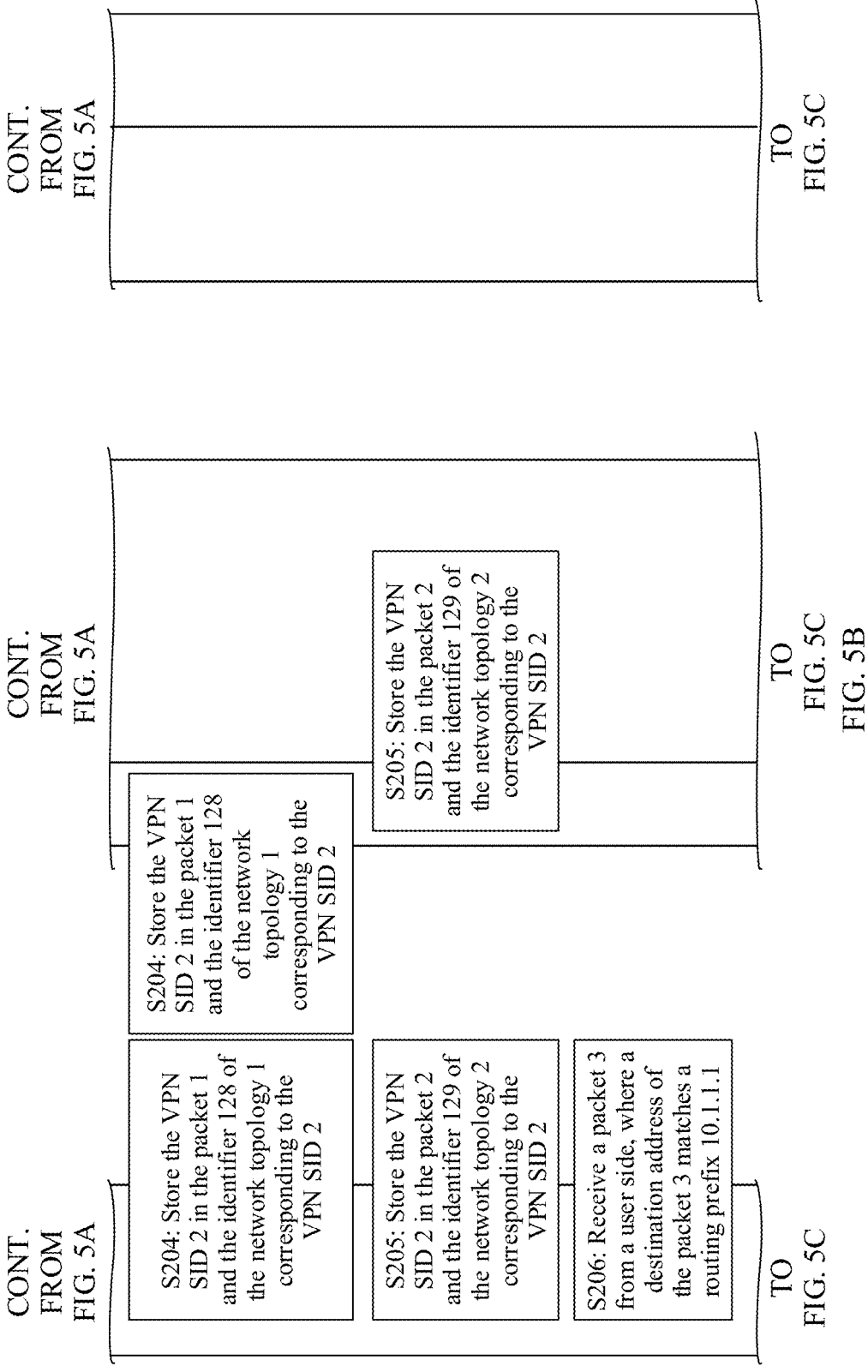

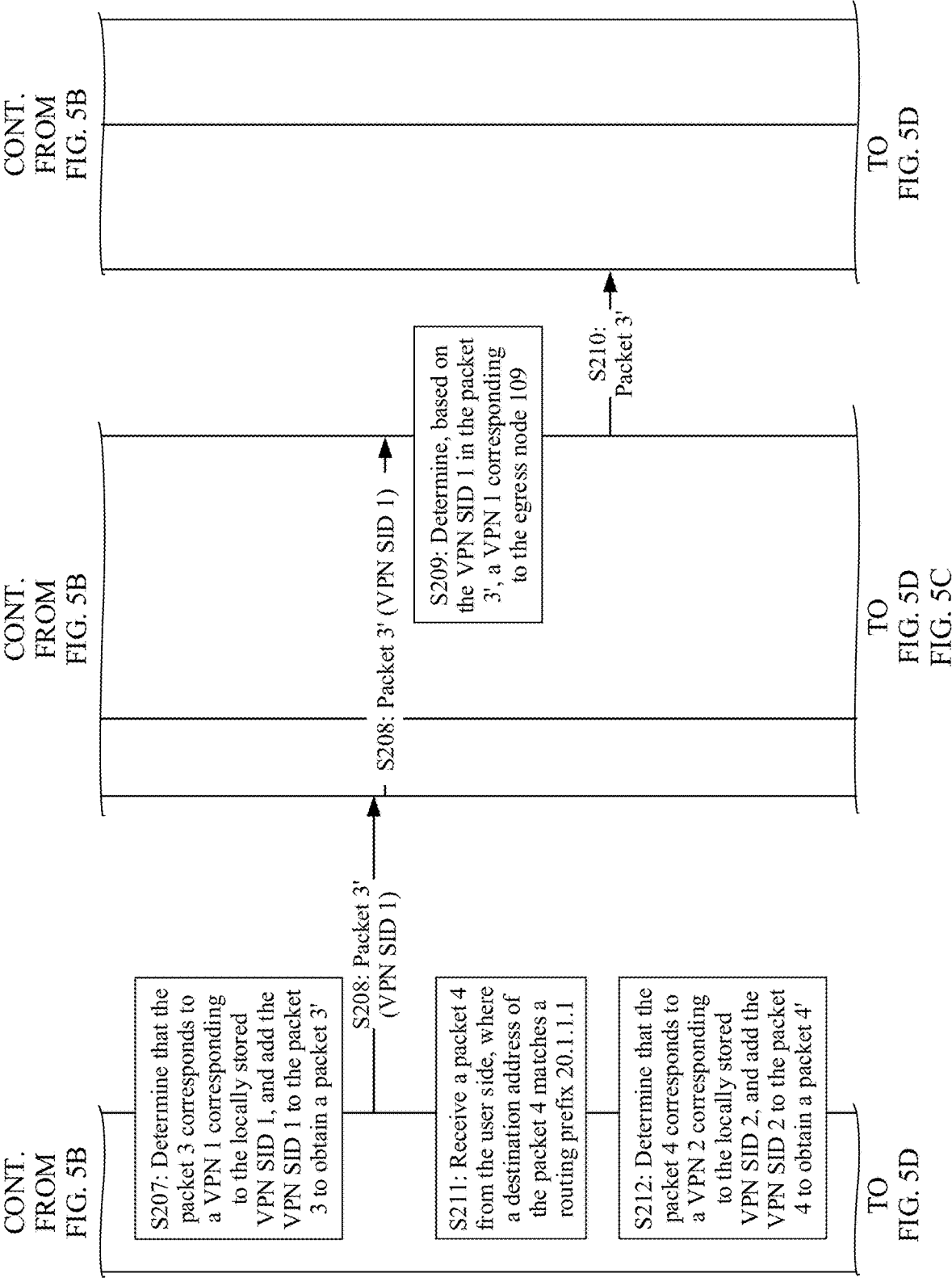

600

700

800

900

METHOD AND APPARATUS FOR TRANSMITTING VIRTUAL PRIVATE NETWORK SEGMENT IDENTIFIER VPN SID, AND NETWORK DEVICE

CROSS-REFERENCE TO RELATED APPLICATIONS

This application is a continuation of International Application No. PCT/CN2021/106286, filed on Jul. 14, 2021, which claims priority to Chinese Patent Application No. 202010830252.2, filed on Aug. 18, 2020 and Chinese Patent Application No. 202011158079.2, filed on Oct. 26, 2020. All of the aforementioned patent applications are hereby incorporated by reference in their entireties.

TECHNICAL FIELD

This application relates to the field of communications technologies, and in particular, to a method and an apparatus for transmitting a virtual private network segment identifier (VPN SID for short), and a network device.

BACKGROUND

In a segment routing over internet protocol version 6 (SRv6 for short) network, generally, an egress node sends a VPN SID to an ingress node, and an intermediate node does not sense the VPN SID of the egress node.

Currently, when a service packet of a VPN corresponding to the VPN SID is forwarded, the ingress node uses the VPN SID of the egress node as a destination address of the VPN service packet, to indicate the service packet of the VPN to be forwarded to the egress node. However, a routing table of the intermediate node does not have the VPN SID, and the intermediate node implements forwarding of the service packet of the VPN in another manner (for example, a manner of relying on a summary route).

However, in many SRv6 scenarios, for a VPN service that needs to be provisioned, VPN route convergence needs to be performed for the VPN service. To be specific, a VPN SID is transmitted to each node, and a forwarding entry of each node about the VPN service is associated with the VPN SID of the egress node. However, in a current technical solution, a VPN SID is not sensed by an intermediate node. Therefore, corresponding VPN route convergence cannot be implemented, and VPN service-level control cannot be implemented.

SUMMARY

This application provides a method and an apparatus for transmitting a VPN SID, and a network device. A VPN SID associated with an egress node is diffused in a network, and each node in the network can sense the VPN SID, to implement VPN route convergence, and enable VPN service-level control to be possible.

The following method, apparatus, and network device provided in this application can be applied to a possible service scenario such as SRv6 best effort (BE).

According to a first aspect, this application provides a method for transmitting a VPN SID. For example, the method includes: After receiving a first packet including a VPN SID, an ingress node receives a second packet of a VPN corresponding to the VPN SID from a user side. In this case, the ingress node may add the VPN SID to the second packet to obtain an updated second packet, and send the updated second packet. In this way, a first intermediate node on a forwarding path of the updated second packet may determine, based on matching between a local VPN SID and the VPN SID in the updated second packet, a second intermediate node or an egress node that receives the updated second packet. It can be learned that, by using the method, the egress node sends the VPN SID corresponding to the egress node to each node in a network, and indicates each node to store the VPN SID of the egress node, so that both the ingress node and each intermediate node can sense and store the VPN SID. For the packet that is of the VPN corresponding to the VPN SID and that is sent by the user side, the ingress node adds the corresponding VPN SID to the packet and sends the packet, and each intermediate node may guide, based on the locally stored VPN SID, forwarding of the updated packet including the VPN SID, to implement VPN service-level control. In addition, when a VPN service needs to be provisioned, because each node stores the VPN SID of the egress node, it is possible for each node to associate the VPN SID with a forwarding entry of the VPN service to be provisioned in a forwarding table, to implement preferential VPN route convergence.

In an embodiment, in addition to the VPN SID of the egress node, the first packet may further include an address of a destination device. After receiving the first packet, the ingress node may correspondingly store the VPN SID and the address of the destination device. In this case, for example, that the ingress node receives a second packet of a VPN corresponding to the VPN SID, and adds the VPN SID to the second packet may include: After receiving the second packet carrying the address of the destination device, the ingress node adds the VPN SID to a destination address field of a packet header of the second packet based on a correspondence between the address of the destination device carried in the second packet and the VPN SID, to obtain the updated second packet. In this way, a data basis is provided for each intermediate node to accurately forward the updated second packet subsequently and implement VPN service-level control.

The first packet may be a border gateway protocol (BGP) packet. In this case, the VPN SID may be carried in an internet protocol (IP) unicast address family of the BGP packet. Alternatively, the first packet may be an interior gateway protocol (IGP) packet.

In an embodiment, the first packet may further include an address of a destination device. In this case, after the ingress node receives the first packet, the method may further include: The ingress node generates a first forwarding entry based on the first packet, where the first forwarding entry includes a correspondence between the VPN SID and the address of the destination device. In this way, a basis is provided for the ingress node to forward the packet of the VPN corresponding to the VPN SID.

In an embodiment, when the ingress node receives a third packet that does not include the VPN SID and the first packet that includes the VPN SID, that the ingress node generates a first forwarding entry based on the first packet may specifically include: The ingress node determines, based on the VPN SID included in the first packet, to generate the first forwarding entry prior to a second forwarding entry, where the second forwarding entry is a forwarding entry generated based on the third packet. When it is determined whether the first packet carries the VPN SID of the egress node, when the first packet is an IGP packet, it may be directly determined whether the first packet carries the VPN SID; and when the first packet is a BGP packet, it may be determined whether a specified field of public network route NLRI in the first packet carries the VPN SID. In this way, requirements of some scenarios in which preferential VPN service convergence is required can be met, so that preferential VPN route convergence is first implemented and then other route convergence is performed.

In an embodiment, the VPN SID in the updated second packet may specifically indicate the first intermediate node to perform exact matching based on the locally stored VPN SID and the VPN SID in the updated second packet, to determine the second intermediate node or the egress node that receives the updated second packet. Compared with a current longest matching principle, 128-bit exact matching can guide packet forwarding more exactly. In some specific application scenarios, for example, the intermediate node performs, based on the VPN SID, exact matching to perform forwarding, to implement VPN service forwarding control with a finer granularity.

In an embodiment, the first packet may further include an identifier (for example, may be a flexible algorithm (Flex-Algo)) of a network topology corresponding to the VPN Then, that the ingress node sends the updated second packet may be specifically: determining, based on the VPN SID corresponding to the second packet, the identifier of the network topology corresponding to the VPN SID, and sending the updated second packet to another node in the network topology indicated by the identifier of the network topology. The identifier of the network topology may be carried by using a type length value (TLV) field defined in a field that is in the first packet and that is used to carry the VPN SID. In this way, for the second packet that is of the VPN corresponding to the VPN SID and that is sent by the user side, both the ingress node and each intermediate node can guide accurate forwarding of the packet in a specified network topology based on the locally stored VPN SID, to implement more refined VPN service-level control.

According to a second aspect, this application further provides a method for transmitting a VPN SID. The method includes: When receiving a second packet including a VPN SID from an ingress node, a first intermediate node may determine, based on matching between a local VPN SID and the VPN SID in the second packet, a next-hop node that receives the second packet, and send the second packet to the determined next-hop node, where the next-hop node is a second intermediate node or an egress node. It can be learned that, by using the method, when receiving the second packet including the VPN SID from the ingress node, the intermediate node can guide, based on the locally stored VPN SID, forwarding of the second packet including the VPN SID, to implement VPN service-level control. In addition, when a VPN service needs to be provisioned, because each node stores the VPN SID of the egress node, it is possible for each node to associate the VPN SID with a forwarding entry of the VPN service to be provisioned in a forwarding table, to implement preferential VPN route convergence.

In an embodiment, before that a first intermediate node receives a second packet from an ingress node, the method may further include: The first intermediate node receives a first packet including the VPN SID, and stores the VPN SID. The egress node may directly or indirectly send the first packet including the VPN SID to the first intermediate node. In this way, the intermediate node receives and stores the VPN SID corresponding to the egress node, to prepare for subsequent forwarding of the packet of the VPN matching the VPN SID by the intermediate node.

In an example, to enable all other nodes to receive the first packet and store the VPN SID in the first packet, the method may further include: The first intermediate node forwards the first packet to the second intermediate node or the ingress node.

The first packet may be a BGP packet, and the VPN SID may be carried in an IP unicast address family of the BGP packet. Alternatively, the first packet may be an IGP packet.

In an embodiment, for example, that the first intermediate node stores the VPN SID may include: The first intermediate node generates and stores a first forwarding entry based on the first packet. The first forwarding entry includes a correspondence between a next-hop node identifier and the VPN SID. In this case, that the first intermediate node determines, based on matching between a local VPN SID and the VPN SID in the second packet, a next-hop node that receives the second packet may include: The first intermediate node determines the first forwarding entry based on the VPN SID in the second packet, and then determines, based on the next-hop node identifier in the first forwarding entry, the next-hop node that receives the second packet. In this way, the VPN SID is associated with a corresponding forwarding entry to guide specific packet forwarding, to implement refined VPN service-level control.

In an embodiment, the method further includes: The first intermediate node receives a third packet that does not include the VPN SID. In this case, that the first intermediate node generates a first forwarding entry based on the first packet may include: The first intermediate node determines, based on the VPN SID included in the first packet, to generate the first forwarding entry prior to a second forwarding entry, where the second forwarding entry is a forwarding entry generated based on the third packet. When it is determined whether the first packet carries the VPN SID of the egress node, when the first packet is an IGP packet, it may be directly determined whether the first packet carries the VPN SID; and when the first packet is a BGP packet, it may be determined whether a specified field of public network route NLRI in the first packet carries the VPN SID. In this way, requirements of some scenarios in which preferential VPN service convergence is required can be met, so that preferential VPN route convergence is first implemented and then other route convergence is performed.

In an embodiment, for example, that the first intermediate node determines, based on matching between a local VPN SID and the VPN SID in the second packet, a next-hop node that receives the second packet may include: The first intermediate node determines, based on exact matching between the local VPN SID and the VPN SID in the second packet, the next-hop node that receives the second packet. In this manner, exact matching of the VPN SIDS can guide packet forwarding more accurately.

In an embodiment, the first packet may further include an identifier (for example, may be a FlexAlgo corresponding to the VPN SID) of a network topology corresponding to the VPN SID, and the identifier of the network topology indicates the first intermediate node to determine a correspondence between the VPN SID, the next-hop node, and the identifier of the network topology, where the next-hop node is a node in the network topology identified by the identifier of the network topology. The identifier of the network topology may be carried by using a TLV field defined in a field that is in the first packet and that is used to carry the VPN SID. In this way, for the second packet that is of the VPN corresponding to the VPN SID and that is sent from the ingress node, each intermediate node can guide accurate forwarding of the packet in a specified network topology based on the locally stored VPN SID, to implement more refined VPN service-level control.

According to a third aspect, this application further provides a method for transmitting a VPN SID. The method may include: After obtaining a VPN SID corresponding to an egress node, the egress node sends a first packet including the VPN SID to an intermediate node, where the first packet indicates the intermediate node to store the VPN SID. It can be learned that, by using the method, the egress node sends the VPN SID to the intermediate node and indicates the intermediate node to store the VPN SID, so that it is possible for the intermediate node to guide, based on the locally stored VPN SID, forwarding of a packet including the VPN SID and implement VPN service-level control. In addition, when a VPN service needs to be provisioned, because each node stores the VPN SID of the egress node, it is possible for each node to associate the VPN SID with a forwarding entry of the VPN service to be provisioned in a forwarding table, to implement preferential VPN route convergence.

The first packet may be a BGP packet, and the VPN SID may be carried in an IP unicast address family of the BGP packet. Alternatively, the first packet may be an IGP packet.

In an embodiment, the VPN SID indicates the intermediate node to determine, based on matching between the local VPN SID and the VPN SID in the received second packet, a next-hop node that receives the second packet.

In an embodiment, that the first packet indicates another node to store the VPN SID is specifically that the first packet indicates the intermediate node to generate a first forwarding entry based on the VPN SID, the first forwarding entry includes a correspondence between the VPN SID and a next-hop node identifier, and the first forwarding entry indicates the intermediate node to forward the received second packet to the next-hop node.

In an embodiment, the first packet further includes an identifier (for example, may be a FlexAlgo corresponding to the VPN SID) of a network topology corresponding to the VPN SID, the first packet indicates the intermediate node to generate the first forwarding entry based on the identifier of the network topology and the VPN SID, the first forwarding entry includes a correspondence between the VPN SID, the next-hop node, and the identifier of the network topology, and the next-hop node is a node in the network topology identified by the identifier of the network topology. The identifier of the network topology may be carried by using a TLV field defined in a field that is in the first packet and that is used to carry the VPN SID. In this way, for the packet that is of the VPN corresponding to the VPN SID and that is sent from the ingress node, each intermediate node can guide accurate forwarding of the packet in a specified network topology based on the locally stored VPN SID, to implement more refined VPN service-level control.

According to a fourth aspect, this application further provides an apparatus for transmitting a VPN SID. The apparatus is used for an ingress node, and the apparatus may include a first receiving unit, a second receiving unit, and a sending unit. The first receiving unit is configured to receive a first packet, where the first packet includes a virtual private network segment identifier VPN SID. The second receiving unit is configured to receive a second packet of a VPN corresponding to the VPN SID from a user side, and add the VPN SID to the second packet to obtain an updated second packet. The VPN SID indicates a first intermediate node on a forwarding path of the updated second packet to determine, based on matching between a local VPN SID and the VPN SID in the updated second packet, a second intermediate node or an egress node that receives the updated second packet. The sending unit is configured to send the updated second packet.

In an embodiment, if the first packet further includes an address of a destination device, the second receiving unit may include a first receiving subunit and an adding subunit. The first receiving subunit is configured to receive the second packet, where the second packet carries the address of the destination device. The adding subunit is configured to add the VPN SID to a destination address field of a packet header of the second packet based on a correspondence between the address of the destination device carried in the second packet and the VPN SID.

In an embodiment, the first packet is a BGP packet, and the VPN SID is carried in an IP unicast address family of the BGP packet. Alternatively, the first packet is an IGP packet.

In an embodiment, the first packet further includes an address of a destination device, and the apparatus further includes a generation unit. The generation unit is configured to generate a first forwarding entry based on the first packet, where the first forwarding entry includes a correspondence between the VPN SID and the address of the destination device.

In an embodiment, the apparatus further includes a third receiving unit. The third receiving unit is configured to receive a third packet, where the third packet does not include the VPN SID. In this case, the generation unit is specifically configured to: determine, based on the VPN SID included in the first packet, to generate the first forwarding entry prior to a second forwarding entry, where the second forwarding entry is a forwarding entry generated based on the third packet.

In an embodiment, the VPN SID specifically indicates the first intermediate node to perform exact matching based on the locally stored VPN SID and the VPN SID in the updated second packet, to determine the second intermediate node or the egress node that receives the updated second packet.

In an embodiment, the first packet further includes an identifier of a network topology corresponding to the VPN SID. In this case, the sending unit is specifically configured to: determine, based on the VPN SID corresponding to the second packet, the identifier of the network topology corresponding to the VPN SID, and send the updated second packet to another node, where the another node is an intermediate node in the network topology indicated by the identifier of the network topology. The identifier of the network topology may be carried by using a TLV field defined in a field that is in the first packet and that is used to carry the VPN SID. For example, the identifier of the network topology may be a FlexAlgo identifier.

The apparatus for transmitting a VPN SID provided in the fourth aspect is configured to perform a related operation mentioned in the first aspect. For specific implementations and achieved effects of the apparatus, refer to related description of the first aspect. Details are not described herein again.

According to a fifth aspect, this application further provides an apparatus for transmitting a VPN SID. The apparatus is used for a first intermediate node, and the apparatus includes a first receiving unit, a determining unit, and a first sending unit. The first receiving unit is configured to receive a second packet from an ingress node, where the second packet includes a virtual private network segment identifier VPN SID. The determining unit is configured to determine, based on matching between a local VPN SID and the VPN SID in the second packet, a next-hop node that receives the second packet. The next-hop node is a second intermediate node or an egress node. The first sending unit is configured to send the second packet to the next-hop node.

In an embodiment, the apparatus further includes a second receiving unit and a storage unit. The second receiving unit is configured to receive a first packet before receiving the second packet from the ingress node, where the first packet includes the VPN SID; and the storage unit is configured to store the VPN SID.

In an embodiment, the apparatus further includes a second sending unit. The second sending unit is configured to forward the first packet to the second intermediate node or the ingress node.

In an embodiment, the first packet may be a BGP packet, and the VPN SID is carried in an IP unicast address family of the BGP packet. Alternatively, the first packet may be an IGP packet.

In an embodiment, the storage unit is specifically configured to: generate and store a first forwarding entry based on the first packet, where the first forwarding entry includes a correspondence between a next-hop node identifier and the VPN SID. In this case, the determining unit includes a first determining subunit and a second determining subunit. The first determining subunit is configured to hit the first forwarding entry based on the VPN SID in the second packet. The second determining subunit is configured to determine, based on the next-hop node identifier in the first forwarding entry, the next-hop node that receives the second packet.

In an embodiment, the apparatus further includes a third receiving unit. The third receiving unit is configured to receive a third packet, where the third packet does not include the VPN SID. In this case, the storage unit is specifically configured to: determine, based on the VPN SID included in the first packet, to generate the first forwarding entry prior to a second forwarding entry, where the second forwarding entry is a forwarding entry generated based on the third packet.

In an embodiment, the determining unit is specifically configured to: determine, based on exact matching between a local VPN SID and the VPN SID in the second packet, a next-hop node that receives the second packet.

In an embodiment, the first packet further includes an identifier of a network topology corresponding to the VPN SID, and the identifier of the network topology indicates the first intermediate node to determine a correspondence between the VPN SID, the next-hop node, and the identifier of the network topology, where the next-hop node is a node in the network topology identified by the identifier of the network topology. The identifier of the network topology may be carried by using a TLV field defined in a field that is in the first packet and that is used to carry the VPN SID. For example, the identifier of the network topology may be a FlexAlgo identifier.

The apparatus for transmitting a VPN SID provided in the fifth aspect is configured to perform a related operation mentioned in the second aspect. For specific implementations and achieved effects of the apparatus, refer to related description of the second aspect. Details are not described herein again.

According to a sixth aspect, this application further provides an apparatus for transmitting a VPN SID. The apparatus is used for an egress node, and the apparatus includes an obtaining unit and a sending unit. The obtaining unit is configured to obtain a virtual private network segment identifier VPN SID corresponding to the egress node. The sending unit is configured to send a first packet to an intermediate node, where the first packet includes the VPN SID, and the first packet indicates the intermediate node to store the VPN SID.

In an embodiment, the first packet may be a BGP packet, and the VPN SID is carried in an IP unicast address family of the BGP packet. Alternatively, the first packet may be an IGP packet.

In an embodiment, the VPN SID indicates the intermediate node to determine, based on matching between the local VPN SID and the VPN SID in the received second packet, a next-hop node that receives the second packet.

In an embodiment, that the first packet indicates another node to store the VPN SID is specifically that the first packet indicates the intermediate node to generate a first forwarding entry based on the VPN SID, the first forwarding entry includes a correspondence between the VPN SID and a next-hop node identifier, and the first forwarding entry indicates the intermediate node to forward the received second packet to the next-hop node.

In an embodiment, the first packet further includes an identifier of a network topology corresponding to the VPN SID, the first packet indicates the intermediate node to generate the first forwarding entry based on the identifier of the network topology and the VPN SID, the first forwarding entry includes a correspondence between the VPN SID, the next-hop node, and the identifier of the network topology, and the next-hop node is a node in the network topology identified by the identifier of the network topology. The identifier of the network topology may be carried by using a TLV field defined in a field that is in the first packet and that is used to carry the VPN SID. For example, the identifier of the network topology may be a FlexAlgo identifier.

The apparatus for transmitting a VPN SID provided in the sixth aspect is configured to perform a related operation mentioned in the third aspect. For specific implementations and achieved effects of the apparatus, refer to related description of the third aspect. Details are not described herein again.

According to a seventh aspect, this application further provides a network device. The network device includes a processor, configured to enable the network device to implement the method provided in the first aspect, the second aspect, or the third aspect. The network device may further include a memory. The memory is coupled to the processor. When the processor executes instructions stored in the memory, the network device may be enabled to implement the method provided in the first aspect, the second aspect, or the third aspect. The network device may further include a communication interface. The communication interface is configured by the device to communicate with another device. For example, the communication interface may be a transceiver, a circuit, a bus, a module, or a communication interface of another type. In this application, the instructions in the memory may be stored in advance, or may be stored after being downloaded from the internet when the network device is used. A source of the instructions in the memory is not specifically limited in this application.

According to an eighth aspect, this application further provides a network system. The network system includes an ingress node, an egress node, and a first intermediate node. The ingress node is configured to perform the method provided in the first aspect, the first intermediate node is configured to perform the method provided in the second aspect, and the egress node is configured to perform the method provided in the third aspect.

According to a ninth aspect, this application provides a chip, including a processor and an interface circuit. The interface circuit is configured to receive instructions and transmit the instructions to the processor. The processor is configured to execute the instructions corresponding to the method provided in the first aspect, the second aspect, or the third aspect.

According to a tenth aspect, this application provides a computer-readable storage medium. The computer-readable storage medium stores program code or instructions; and when the program code or the instructions are run on a computer, the computer is enabled to perform the method provided in the first aspect, the second aspect, or the third aspect.

BRIEF DESCRIPTION OF DRAWINGS

FIG. 3a is a schematic diagram of a format of an IGP packet according to an embodiment of this application;

FIG. 3b is a schematic diagram of a format of a BGP packet according to an embodiment of this application;

FIG. 5A to FIG. 5D are a signaling flowchart of a method 200 for transmitting a VPN SID according to an embodiment of this application;

DESCRIPTION OF EMBODIMENTS

Figure 1:
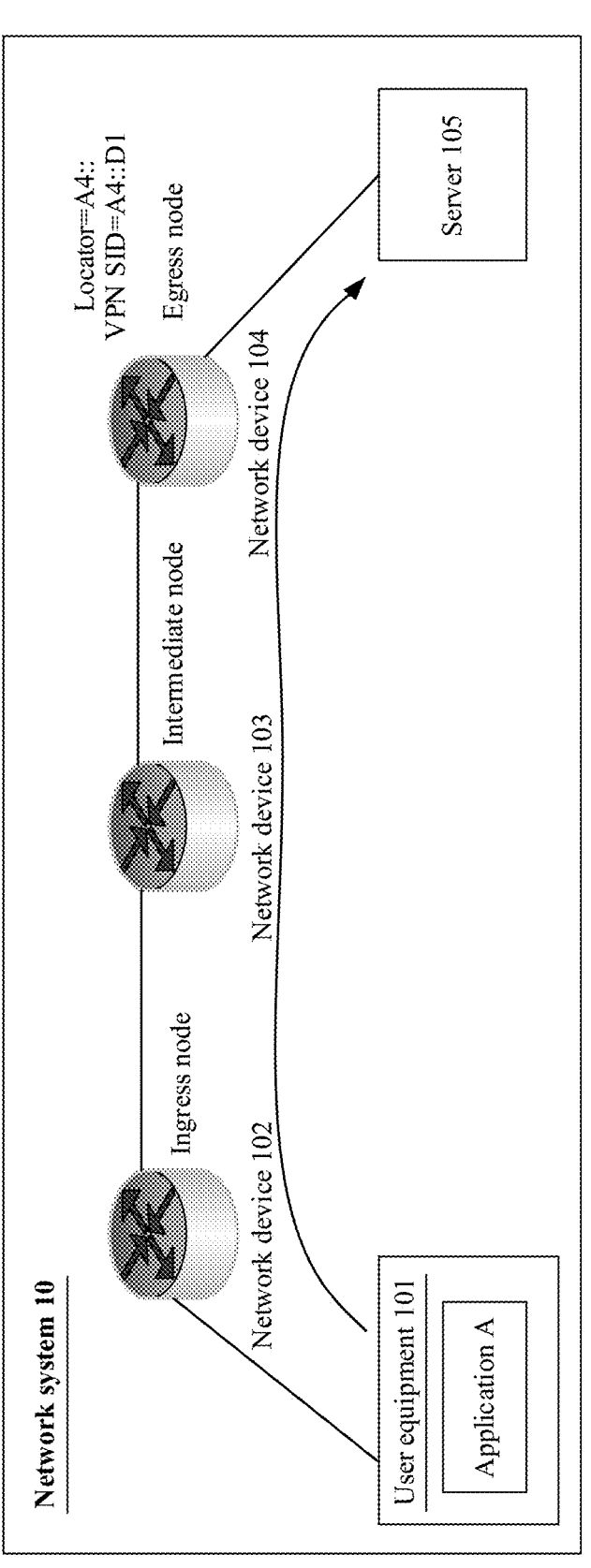
FIG. 1 is a schematic diagram of a structure of a network system 10 according to an embodiment of this application.

Currently, in a packet forwarding process, an ingress node uses a sensed VPN SID of an egress node as a destination address of a packet to be forwarded, to guide the packet to be forwarded out of the ingress node. However, because an intermediate node cannot sense the VPN SID of the egress node, a routing table of the intermediate node is not associated with the VPN SID of the egress node. Therefore, the intermediate node can implement packet forwarding only in a manner such as a summary route, and cannot guide packet forwarding based on the VPN SID of the egress node. In this way, when a VPN service needs to be provisioned in an SRv6 scenario, VPN route convergence needs to be implemented. However, because the VPN SID of the egress node cannot be sensed by the intermediate node, the VPN route convergence cannot be implemented in a current technical solution, and VPN service-level control cannot be implemented. The VPN route convergence refers to transmitting the VPN SID of the egress node to each node (including the ingress node and each intermediate node), and associating the VPN SID of the egress node with a forwarding entry of each node about the VPN service.

Based on this, embodiments of this application provide a method for transmitting a VPN SID. An egress node sends a VPN SID corresponding to the egress node to each node in a network, and indicates each node to store the VPN SID of the egress node. In this way, an ingress node can sense the VPN SID, and an intermediate node can sense and store the VPN SID. When a VPN service needs to be provisioned, because each node stores the VPN SID of the egress node, it is possible for each node to associate the VPN SID with a forwarding entry of the VPN service to be provisioned in a forwarding table, to implement VPN route convergence. In addition, for a packet that is of a VPN corresponding to the VPN SID and that is sent by a user side, both the ingress node and the intermediate node can guide forwarding of the packet based on a locally stored VPN SID, to implement VPN service-level control.

For ease of understanding embodiments of this application, the following first explains meanings of some concepts in embodiments of this application.

A VPN SID is a 128-bit instantiated internet protocol version 6 (IPv6) address, and is used to identify a VPN corresponding to an egress node. The VPN SID includes two parts: a location identifier (Locator) and a function, and may be in a format of Locator:Function, where Locator occupies a high bit of the VPN SID, and Function occupies a remaining part of the VPN SID. Locator in the VPN SID is mainly responsible for routing and is unique in a segment routing (SR) domain. After Locator is configured for a node, the node generates a Locator network segment route and diffuses the route in the SR domain through an interior gateway protocol (, IGP). Another node in the network can locate the node configured with Locator through the Locator network segment route. All VPN SIDs advertised by the node configured with Locator may also reach another node through the Locator network segment route. Function in the VPN SID may be preset by the node that generates the VPN SID, and indicates the node that generates the VPN SID to perform a corresponding function operation, for example, indicates the node that generates the VPN SID to perform a forwarding behavior, or indicates the node that generates the VPN SID to implement a service.

After being generated at a source end, a service packet may be forwarded to a destination end through several transmission nodes in sequence. A transmission path of the service packet from the source end to the destination end includes at least a segment of path passing through a network domain range, and a node on the segment of path can perform control and forwarding for a VPN service based on a VPN SID added to the service packet. The segment of path includes an ingress node, an intermediate node, and an egress node, or may be referred to as a head node, an intermediate node, and a tail node. The head node and the tail node may be, for example, domain border nodes, and a domain may be a network domain, or may be a management domain, or the like. For ease of description, the segment of path that belongs to the transmission path from the source end to the destination end and passes through the ingress node, the intermediate node, and the tail node in sequence is referred to as an end-to-end path below. The end-to-end path may be different from the transmission path from the source end to the destination end. The end-to-end path may be a part of the transmission path from the source end to the destination end.

The ingress node may be the 1$^{st}$ node passed through on the end-to-end path connected to user equipment (namely, the source end) that generates a packet. The ingress node may receive, from a user side, a packet of a VPN corresponding to a received VPN SID, and add the VPN SID to the packet to obtain an updated packet, to send the updated packet on the end-to-end path. The VPN SID in the updated packet indicates an intermediate node on an updated packet forwarding path to determine a next-hop node of the intermediate node based on matching between a local VPN SID and the VPN SID in the updated packet, so that each intermediate node can accurately forward a packet based on the VPN SID in the updated packet.

The intermediate node may be a node other than an ingress node and an egress node that a packet passes through when being transmitted on the end-to-end path. The intermediate node may directly or indirectly receive the packet including the VPN SID from the ingress node. In this case, the intermediate node may determine, based on matching between the locally stored VPN SID and the VPN SID carried in the received packet, the next-hop node of the intermediate node, and send the packet to the determined next-hop node. The next-hop node of the intermediate node may be a next intermediate node connected to the intermediate node on the end-to-end path, or may be an egress node connected to the intermediate node on the end-to-end path.

The egress node may be the last node on the end-to-end path for packet transmission, and the egress node is connected to a destination device of the packet. In a route advertisement phase, or referred to as a VPN SID advertisement phase, the egress node may allocate a corresponding VPN SID to a VPN service, include the VPN SID in a packet for diffusion, and finally send the packet to each node on the end-to-end path, to indicate a node receiving the packet to store the VPN SID. In this way, the ingress node and each intermediate node can implement VPN route convergence, to implement accurate packet forwarding based on a locally stored VPN SID. In a packet forwarding phase, the egress node may determine a corresponding VPN service based on a VPN SID allocated by the egress node, and perform a corresponding service operation for the VPN service, for example, forward a service packet of the VPN service to destination user equipment.

Service packet transmission between user equipment on a user side and a server on a network side in a VPN is used as an example. In this network scenario, in one case, the ingress node may be, for example, a customer edge (CE) device connected to the user equipment that sends a service packet, or a provider edge (PE) device connected to the CE device, and the egress node may be, for example, a CE device or a PE device connected to the server that receives the service packet. Alternatively, in another case, the ingress node may be, for example, a CE device or a PE device connected to the server that sends a service packet, and the egress node may be, for example, a CE device or a PE device connected to user equipment that receives the service packet. The ingress node and the egress node may be located in a same autonomous system (AS) domain, or may be located in different AS domains. There may be zero, one, two, or more intermediate nodes between the ingress node and the egress node, and the intermediate node may be, for example, another PE device or gateway device in the foregoing network scenario.

It should be noted that the node in embodiments of this application may be an independent network device that can provide a routing and forwarding function, for example, may be a router, a switch, a forwarder, or a firewall. Alternatively, the node may be a functional module that has a packet forwarding capability in the network device. In this case, the network device may include a plurality of nodes. For ease of description, an example in which a node is an independent network device is used below for related description, and the node and the network device are used to express a same meaning.

It should be noted that the method provided in embodiments of this application may be applied to an SRv6 best effort (BE) scenario or another needed application scenario.

For ease of understanding the method for transmitting a VPN SID provided in embodiments of this application, the following describes the method with reference to the accompanying drawings.

For example, embodiments of this application may be applied to a network system 10 shown in FIG. 1. FIG. 1 is a schematic diagram of a structure of the network system 10. The network system 10 may include user equipment 101, a network device 102, a network device 103, a network device 104, and a server 105. The user equipment 101 is connected to the server 105 by passing through in sequence the network device 102, the network device 103, and the network device 104. An application A corresponding to the server 105 may be installed on the user equipment 101, and the server 105 provides a service corresponding to the application A for a user. In the network system 10, for example, the user equipment 101 sends a service packet to the server 105, an ingress node is the network device 102, an egress node is the network device 104, and an intermediate node is included between the ingress node and the egress node, that is, the network device 103 is the intermediate node.

Figure 2:
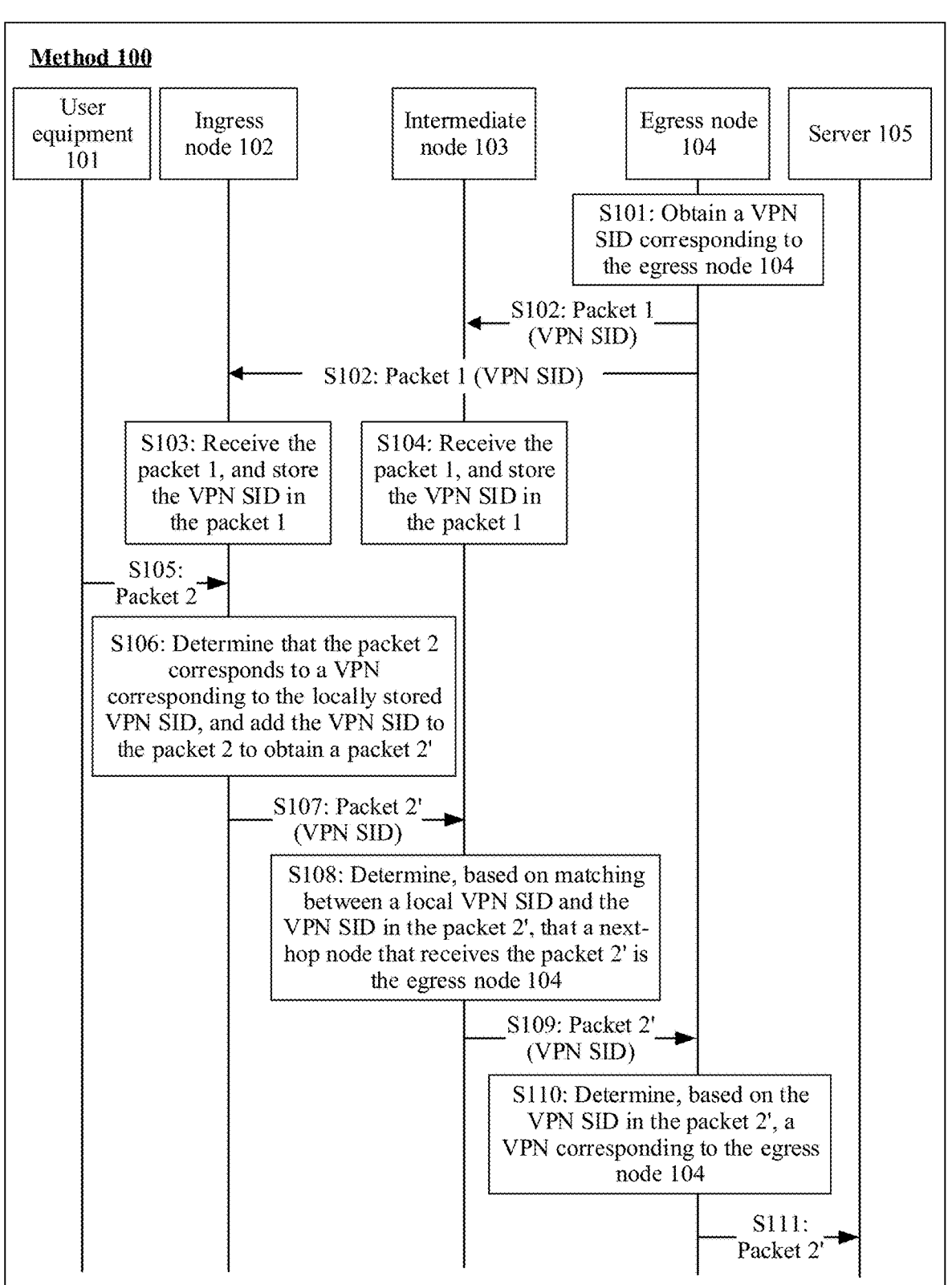
FIG. 2 is a signaling flowchart of a method 100 for transmitting a VPN SID according to an embodiment of this application.

A structure of the network system 10 shown in FIG. 1 is used as an example. FIG. 2 is a schematic flowchart of a method 100 for transmitting a VPN SID according to an embodiment of this application. The method 100 is described by using interaction between the user equipment 101, the ingress node 102, the intermediate node 103, the egress node 104, and the server 105. During specific implementation, the method 100 may include, for example, the following S101 to S111.

S101: The egress node 104 obtains a VPN SID corresponding to the egress node 104.

The VPN SID of the egress node 104 is used to identify a VPN corresponding to the egress node 104. The VPN SID may be Locator and Function. Locator can be used to locate the egress node 104, and Function can be used to identify that the egress node performs a forwarding behavior, a service operation, or the like. For example, the VPN SID of the egress node 104 may be A4:: D1, where Locator is A4::, and Function is D1.

During specific implementation, the egress node 104 may automatically generate the VPN SID corresponding to the egress node 104, or the VPN SID corresponding to the egress node 104 may alternatively be manually configured.

S102: The egress node 104 sends a packet 1 to the intermediate node 103 and the ingress node 102, where the packet 1 includes the VPN SID, and the packet 1 indicates a receiver to store the VPN SID.

When the egress node 104 obtains the VPN SID corresponding to the egress node 104, the egress node 104 may generate the packet 1 including the VPN SID, and send the packet 1 to each node in the network system 10, to diffuse the VPN SID in the network system 10 and provide a data basis for each node to perform accurate packet forwarding based on the VPN It should be understood that the egress node 104 may configure different VPN SIDs for addresses of different destination devices. In this case, when diffusing the VPN SID through the packet 1, the egress node 104 may further include the address of the destination device corresponding to the VPN SID in the packet 1, so that a node receiving the VPN SID can know a specific destination device corresponding to a VPN identified by the VPN SID, to ensure accurate packet forwarding.

In an example, the packet 1 may be an IGP packet, and the IGP packet is used to diffuse the VPN SID corresponding to the egress node 104, so that each node can sense the VPN SID. For example, the IGP packet may carry the VPN SID by using an extended type length value (TLV) field. An example in which the IGP packet is an intermediate system to intermediate system (ISIS) protocol packet is used. A sub-TLV field may be extended in TLV 263 to carry the VPN SID. For a format of the sub-TLV field, refer to FIG. 3a. The sub-TLV field may include: a type Type field, indicating that the sub-TLV carries the VPN SID corresponding to the egress node 104; a length Length field, indicating a total length of the sub-TLV field; and a value Value field (namely, a segment identifier egress node behavior (SID-Endpoint-Behavior) in FIG. 3a) field, used to carry the VPN SID corresponding to the egress node 104, for example, carry End.DT4, End.DT6, or End.DX4 of the egress node 104. In addition, the Value field of the sub-TLV field may further include an algorithm field. The Algorithm field indicates a network topology corresponding to the VPN SID, to be specific, a value of the Algorithm field is an identifier of the network topology corresponding to the VPN SID. For example, the value of the Algorithm field is FlexAlgo=128 or 129. For example, for an IPv6 routing prefix (prefix)=xx:: xx/128 in the ISIS protocol packet, the extended sub-TLV field=<Type=TBD (to be determined, to be determined), Length=2, VPN SID=End.DT4, Algorithm=FlexAlgo 128>. It should be noted that the IGP packet may alternatively be an open shortest-path first (open shortest-path first, OSPF) protocol packet. For a manner in which the OSPF protocol packet carries the VPN SID, refer to the foregoing manner in which the ISIS protocol packet carries the VPN SID. Details are not described herein again.

In another example, the packet 1 may be a border gateway protocol (Border Gateway Protocol, BGP) packet, and the VPN SID may be, for example, carried in an IP unicast address family of the BGP packet. For example, the BGP packet may carry the VPN SID in an IPv6 unicast address family by defining the IPv6 unicast address family. For a format of the BGP packet, for example, refer to FIG. 3b. In the BGP packet, network layer reachability information (NLRI) 1 is extended, an address family identifier (AFI) field corresponding to the NLRI 1 is 2, and a unicast field is 1, indicating that the NLRI 1 advertises a public network route by using the IPv6 unicast address family. The NLRI 1 may include the VPN SID corresponding to the egress node 104. The VPN SID is a 128-bit IPv6 address instance. The VPN SID may further extend a sub-TLV field. The sub-TLV field is used to carry the VPN For a specific format and related description, refer to the description of the sub-TLV field in FIG. 3a. In addition, the extended sub-TLV may further include an identifier of the network topology corresponding to the VPN SID. As shown in FIG. 3b, the BGP packet further includes NLRI 2, where an AFI field corresponding to the NLRI 2 is 2, and a sub address family identifier (SAFI) field is 128, indicating that the NLRI 2 advertises a private network route. The NLRI may include at least the VPN SID corresponding to the egress node 104.

It should be noted that an implementation of S102 is different based on a deployment difference of the network system 10. In one case, if the egress node 104 establishes a neighbor relationship with each node in the network system 10, in S102, the egress node 104 may directly send the packet 1 to the intermediate node 103 and the ingress node 102. In another case, if the egress node 104 establishes a neighbor relationship with the intermediate node 103, and the intermediate node 103 establishes a neighbor relationship with the ingress node 102, in S102, the egress node 104 may directly send the packet 1 to the intermediate node 103, and the intermediate node 103 forwards the packet 1 to the ingress node 102. In still another case, if each node in the network device 10 belongs to an AS, the network system 10 further includes a route reflector (RR), and the RR is connected to each node, in S102, the egress node 104 may send the packet 1 to the RR, and the RR sends the packet 1 to the intermediate node 103 and the ingress node 102. In this way, no neighbor relationship needs to be established between the nodes.

In addition, when the network system includes a plurality of network topologies, the packet 1 may further carry an identifier of the network topology corresponding to the VPN SID, indicating the network topology corresponding to the VPN SID. The identifier of the network topology may be, for example, a flexible algorithm (FlexAlgo) identifier. Different FlexAlgo identifiers indicate different FlexAlgos, and the different FlexAlgos correspond to a group of computation factors, to implement traffic allocation on different network topologies. For specific implementation of the description of the identifier of the network topology corresponding to the VPN SID in the method 100, refer to the following related description of the method 200 shown in FIG. 5A to FIG. 5D.

S103: The ingress node 102 receives the packet 1, and stores the VPN SID in the packet 1.

After receiving the packet 1 sent by the egress node 104, the ingress node 102 obtains, through parsing, the VPN SID carried in the packet 1. In this case, the ingress node 102 may store the VPN SID. The ingress node 102 stores the VPN SID, for example, may generate a forwarding entry 1 based on the VPN SID, where the forwarding entry 1 is used to guide processing of a packet corresponding to the VPN identified by the VPN SID. In an example, the packet 1 may further include an address of a destination device, for example, an address of the server 105. In this case, the forwarding entry 1 generated by the ingress node 102 based on the packet 1 may include a correspondence between the VPN SID and the address of the destination device. The forwarding entry 1 belongs to a VPN forwarding table. It is assumed that an address 10.1.1.1 of the server connected to the egress node 104 is the address of the destination device, and the VPN SID corresponding to the egress node 104 is A4:: D1. For the generated forwarding entry 1, refer to Table 1.

TABLE 1

| Forwarding entry 1 | |
| --- | --- |
| Route Route | Next hop Next-hop |
| 10.1.1.1 | A4::D1 |

The route indicates the address of the destination device, namely, 10.1.1.1. The next hop indicates an IP address of a next-hop node, namely, the VPN SID of the egress node 104.

In addition, the ingress node 102 may further generate a forwarding entry 2 based on the packet 1, and the forwarding entry 2 belongs to a public network forwarding table. The forwarding entry 2 may include at least a correspondence between the route and the next-hop. For example, refer to the following Table 2:

TABLE 2

| Forwarding entry 2 | |
| --- | --- |
| Route Route | Next hop Next-hop |
| A4::D1 | Outbound interface 1 to the intermediate node 103 |

The route indicates a public network IP address of the egress node 104, namely, the VPN SID of the egress node 104. The next hop indicates an outbound interface of a next-hop node, namely, the outbound interface 1 from the ingress node 102 to the intermediate node 103. The outbound interface 1 may be, for example, a physical outbound interface. It should be noted that, if the packet 1 is an IGP packet, the VPN SIDs in Table 1 and Table 2 may come from a same field in the IGP packet, for example, from the sub-TLV field in the IGP packet shown in FIG. 3*a*. If the packet 1 is a BGP packet, the VPN SID included in Table 1 may come from NLRI that is in the packet 1 and that is used to advertise a private network route, for example, the NLRI 2 from the BGP packet shown in FIG. 3*b*. The VPN SID included in Table 2 may come from NLRI that is in the packet 1 and that is used to advertise a public network route, for example, the NLRI 1 from the BGP packet shown in FIG. 3*b*.

It should be noted that the forwarding entry generated by the ingress node 102 based on the packet 1 may alternatively be a forwarding entry 3 shown in the following Table 3:

TABLE 3

| Forwarding entry 3 | | |
| --- | --- | --- |
| Route Route | Next hop Next-hop | Outbound interface Out-interface |
| 10.1.1.1 | A4::D1 | Outbound interface 1 to the intermediate node 103 |

The next hop indicates the VPN SID of the egress node 104. Before generating the forwarding entry, the ingress node 102 may further compare the VPN SID in the NLRI that is used to advertise the public network route and that is in the packet 1 with the VPN SID in the NLRI that is used to advertise the private network route and that is in the packet 1. When a comparison result indicates that the VPN SIDs are consistent, the ingress node 102 generates the forwarding entry 3 based on the packet 1, and next-hop content in the forwarding entry 3 is the consistent VPN SID.

In a possible case, a node that receives the packet 1 obtains the VPN SID of the egress node 104 from the packet 1, and may further generate a forwarding entry prior to another packet that does not carry the VPN SID and that is used to advertise a route, to implement preferential VPN route convergence. For example, the ingress node 102 receives the packet 1 and a packet 3, where the packet 1 carries the VPN SID of the egress node 104, and the packet 3 does not include the VPN SID. In this case, the ingress node 102 may first generate the forwarding entry 1 or the forwarding entry 3 based on the packet 1, to ensure that a forwarding table delivered by the VPN SID corresponding to the egress node 104 is used to guide packet forwarding. Then, the ingress node 102 may also generate a corresponding entry based on the packet 3. In this way, requirements of some scenarios in which preferential VPN service convergence is required can be met, so that preferential VPN route convergence is first implemented and then other route convergence is performed. When it is determined whether the packet 1 carries the VPN SID of the egress node 104, when the packet 1 is an IGP packet, it may be directly determined whether the packet 1 carries the VPN SID, and when the packet 1 is a BGP packet, it may be determined whether a specified field of public network route NLRI in the packet 1 carries the VPN SID.

In this way, the ingress node 102 stores the VPN SID corresponding to the egress node 104, to prepare the ingress node 102 for processing a packet received from a user side. That is, after S103, the ingress node 102 may perform the following S105 to S107.

S104: The intermediate node 103 receives the packet 1, and stores the VPN SID in the packet 1.

In addition to the ingress node 102, each intermediate node may receive the packet 1 and store the VPN SID in the packet 1. In this embodiment, the network system 10 shown in FIG. 1 is used as an example for description, to be specific, the intermediate node 103 receives the packet 1 and stores the VPN SID in the packet 1.

After receiving the packet 1 sent by the egress node 104, the intermediate node 103 obtains, through parsing, the VPN SID carried in the packet 1, and stores the VPN SID. The intermediate node 103 stores the VPN SID, for example, may generate a forwarding entry based on the VPN SID. For a format of the forwarding entry, refer to the following Table 4 and Table 5.

TABLE 4

| Forwarding entry 4 | |
| --- | --- |
| Route Route | Next hop Next-hop |
| 10.1.1.1 | A4::D1 |

TABLE 5

| Forwarding entry 5 | |
| --- | --- |
| Route Route | Next hop Next-hop |
| A4::D1 | Outbound interface 2 to the egress node 104 |

For related description of Table 4, refer to the corresponding description of Table 1. For related description of Table 5, refer to the corresponding description of Table 2. However, the next-hop in Table 5 indicates the outbound interface 2 from the intermediate node 103 to the egress node 104. If the packet 1 is an IGP packet, the VPN SIDs in Table 4 and Table 5 come from a same field in the IGP packet. If the packet 1 is a BGP packet, the VPN SID included in Table 4 comes from NLRI that is in the packet 1 and that is used to advertise a private network route, for example, the NLRI 2 from the BGP packet shown in FIG. 3*b*. The VPN SID included in Table 5 comes from NLRI that is in the packet 1 and that is used to advertise a public network route, for example, the NLRI 1 from the BGP packet shown in FIG. 3*b*.

It should be noted that the forwarding entry generated by the intermediate node 103 based on the packet 1 may alternatively be shown in the following Table 6:

TABLE 6

| Forwarding entry 6 | | |
| --- | --- | --- |
| Route Route | Next hop Next-hop | Outbound interface Out-interface |
| 10.1.1.1 | A4::D1 | Outbound interface 2 to the egress node 104 |

In a possible case, if preferential VPN route convergence needs to be performed, the intermediate node 103 may further preferentially generate the forwarding entry 4 or the forwarding entry 6 based on the packet 1. For example, the intermediate node 103 receives the packet 1 and a packet 3, where the packet 1 carries the VPN SID of the egress node 104, and the packet 3 does not include the VPN SID. In this case, the intermediate node 103 may first generate the forwarding entry 4 or the forwarding entry 6 based on the packet 1, to ensure that a forwarding table delivered by the VPN SID corresponding to the egress node 104 is used to guide packet forwarding. Then, the intermediate node 103 may also generate a corresponding entry based on the packet 3. In this way, preferential VPN route convergence is implemented and then other route convergence is performed.

In this way, the intermediate node 103 stores the VPN SID corresponding to the egress node 104, to prepare the intermediate node 103 for processing a packet received from the ingress node 102. That is, after S104, the intermediate node 103 may perform the following S108 and S109.

It should be noted that there is no limitation on a sequence of performing S103 and S104. S103 may be performed before S104, or S104 may be performed before S103, or S103 and S104 may be simultaneously performed.

After S101 to S104 are performed, the network system 10 prepares for processing a packet from the user equipment 101. For packet processing in the method 100, refer to the following S105 to S111.

S105: The ingress node 102 receives a packet 2 from the user equipment 101.

The packet 2 may be a service packet corresponding to an application A installed on the user equipment 101. The user equipment 101 sends the packet 2 to the server 105 that provides a service for the application A, to implement a corresponding service.

S106: The ingress node 102 determines that the packet 2 corresponds to the VPN corresponding to the locally stored VPN SID, and adds the VPN SID to the packet 2 to obtain a packet 2'. The VPN SID indicates the intermediate node 103 on a forwarding path of the packet 2' to determine, based on matching between the local VPN SID and the VPN SID in packet 2', a next-hop node that receives the packet 2'.

S107: The ingress node 102 sends the packet 2' to the intermediate node 103, where the packet 2' includes the VPN SID.

During specific implementation, after receiving the packet 2, the ingress node 102 may obtain a destination address of the packet 2 through parsing the packet 2. In this case, the ingress node 102 may match the destination address of the packet 2 with a routing prefix in each forwarding entry in a local forwarding table. Once a forwarding entry is hit, the ingress node 102 can process the packet 2 based on the forwarding entry.

In an example, it is assumed that the ingress node 102 stores a forwarding table 1 and a forwarding table 2, and the forwarding table 1 and the forwarding table 2 respectively include the forwarding entry 1 shown in Table 1 and the forwarding entry 2 shown in Table 2. When the ingress node 102 receives the packet 2 and determines that the destination address carried in the packet 2 matches the routing prefix 10.1.1.1 in the forwarding entry 1, the ingress node 102 may add a next hop A4:: D1 in the forwarding entry 1 to the packet 2 to obtain the packet 2', where A4:: D1 (namely, the VPN SID corresponding to the egress node 104) is used by the intermediate node 103 to determine, based on matching between the local VPN SID and A4:: D1 in the packet 2', a next-hop node that receives the packet 2'. The ingress node 102 may further match the next hop A4:: D1 in the forwarding entry 1 with a route of each routing entry in the local forwarding table 2, and determine that the route A4:: D1 in the forwarding entry 2 is hit. In this case, the ingress node 102 may determine that an outbound interface for transmitting the packet 2 (or the packet 2') to the next hop (namely, the intermediate node 103) is the outbound interface 1. To be specific, the ingress node 102 determines, based on the forwarding entry 2, that the packet 2' should be forwarded to the intermediate node 103 through the outbound interface 1.

In another example, it is assumed that the ingress node 102 stores a forwarding table 3, and the forwarding table 3 includes the forwarding entry 3 shown in Table 3. When the ingress node 102 receives the packet 2 and determines that the destination address carried in the packet 2 matches the routing prefix 10.1.1.1 in the forwarding entry 3, the ingress node 102 may add a next hop A4:: D1 in the forwarding entry 3 to the packet 2 to obtain the packet 2', where A4:: D1 (namely, the VPN SID corresponding to the egress node 104) is used by the intermediate node 103 to determine, based on matching between the local VPN SID and A4:: D1 in the packet 2', a next-hop node that receives the packet 2'. The ingress node 102 may further determine, based on the forwarding entry 3, that an outbound interface for transmitting the packet 2 (or the packet 2') to the next hop (namely, the intermediate node 103) is the outbound interface 1. To be specific, the ingress node 102 determines, based on the forwarding entry 3, that the packet 2' should be forwarded to the intermediate node 103 through the outbound interface 1.

The ingress node 102 adds the VPN SID to the packet 2, for example, may set the VPN SID to be the destination address (DA) of the packet 2, to obtain the packet 2'.

It should be noted that S105 to S107 only need to be performed after S103, and there is no limitation on a sequence of performing S105 to S107 and S104. In addition, S103 and S105 to S107 may be implemented on the ingress node 102 as a separate embodiment. This embodiment of this application is merely used to completely describe the provided technical solution. Therefore, interaction between a plurality of execution bodies in the network system is used for description.

S108: The intermediate node 103 determines, based on matching between the local VPN SID and the VPN SID in the packet 2', that the next-hop node that receives the packet 2' is the egress node 104.

After the intermediate node 103 receives the packet 2', because the VPN SID corresponding to the egress interface 104 is locally stored, the intermediate node 103 may parse the packet 2' to obtain the VPN SID carried in the packet 2', and match the VPN SID with the locally stored VPN SID. Once the VPN SID is matched, the intermediate node 103 can determine, based on the matched VPN SID, the next-hop node that receives the packet 2'. For example, if a first forwarding entry stored by the intermediate node 103 includes a correspondence between a next-hop node identifier and the VPN SID, S108 may specifically include: The intermediate node 103 hits the first forwarding entry based on the VPN SID in the packet 2'; and then the intermediate node 103 determines, based on the next-hop node identifier in the first forwarding entry, the next-hop node that receives the packet 2'.

The matching performed by the intermediate node 103 between the local VPN SID and the VPN SID in the packet 2' may be 128-bit exact matching. To be specific, if a 128-bit VPN SID in the packet 2' is compared with a locally stored 128-bit VPN SID, and each bit is correspondingly matched, it is considered that the VPN SID in the packet 2' matches the locally stored VPN SID, and the next-hop node that receives the packet 2' is accurately determined. In this way, because the VPN SID may be diffused and stored in each node in a network domain including an intermediate node, in a phase such as forwarding a VPN service packet, the VPN SID can be searched for based on an exact matching manner, preferential VPN service convergence can be implemented based on a hit VPN SID, and a packet can be exactly guided to be forwarded according to a preset forwarding rule and based on a forwarding entry.

For example, it is assumed that the intermediate node 103 stores a forwarding table 5, and the forwarding table 5 includes the forwarding entry 5 shown in Table 5. In this case, when the intermediate node 103 receives the packet 2' and determines that the VPN SID indicated by a DA field in the packet 2' matches the routing prefix A4:: D1 in the forwarding entry 5, the intermediate node 103 may determine, based on the forwarding entry 5, that an outbound interface for transmitting the packet 2' to the next hop (namely, the egress node 104) is the outbound interface 2. To be specific, the intermediate node 103 determines, based on the forwarding entry 5, that the packet 2' should be forwarded through the outbound interface 2 to the egress node 104. Optionally, the intermediate node 103 may further store a forwarding table 4, and the forwarding table 4 includes the forwarding entry 4 shown in Table 4. Therefore, before forwarding the packet 2', to ensure reliability of a forwarding operation, the intermediate node 103 may further compare VPN SIDs in the forwarding entry 4 and the forwarding entry 5. If the VPN SIDs are the same, the intermediate node 103 forwards the packet 2' based on next-hop content in the forwarding entry 5. Otherwise, it is considered that the VPN SID in the forwarding entry 5 or the VPN SID in the packet 2' is incorrect, and the intermediate node 103 does not process the packet 2'.

For another example, it is assumed that the intermediate node 103 stores a forwarding table 6, and the forwarding table 6 includes the forwarding entry 6 shown in Table 6. In this case, when the intermediate node 103 receives the packet 2' and determines that the VPN SID indicated by a DA field in the packet 2' matches the next hop A4:: D1 in the forwarding entry 6, the intermediate node 103 may determine, based on the forwarding entry 6, that an outbound interface for transmitting the packet 2' to the next hop (namely, the egress node 104) is the outbound interface 2. To be specific, the intermediate node 103 determines, based on the forwarding entry 6, that the packet 2' should be forwarded through the outbound interface 2 to the egress node 104.

S109: The intermediate node 103 sends the packet 2' to the egress node 104.

During specific implementation, the intermediate node 103 sends the packet 2' to the egress node 104 through the outbound interface 2, where the packet 2' includes a DA field whose value is the VPN SID.

It should be noted that S108 and S109 need to be performed after S104. In addition, S104, S108, and S109 may be implemented on the intermediate node 103 as a separate embodiment. This embodiment of this application is merely used to completely describe the provided technical solution. Therefore, interaction between a plurality of execution bodies in the network system is used for description.

S110: The egress node 104 determines, based on the VPN SID in the packet 2', a VPN corresponding to the egress node 104.

S111: The egress node 104 sends the packet 2' to the server 105 corresponding to the determined VPN.

After receiving the packet 2', the egress node 104 may parse the packet 2' to obtain the VPN SID carried in the packet 2', and find that the VPN SID carried in the packet 2' is the VPN SID corresponding to the egress node 104. Therefore, the egress node 104 may determine a VPN of the egress node 104 based on the VPN SID, and sends the packet 2' to a node (namely, the server 105) corresponding to the determined VPN.

The egress node 104 may correspond to at least one VPN, and each VPN SID uniquely identifies a corresponding VPN. The egress node 104 may maintain a correspondence between each VPN SID, VPN, and outbound interface in a form of a forwarding table. In this way, when receiving a packet carrying the VPN SID of the egress node 104, the egress node 104 may hit a forwarding entry corresponding to the VPN SID in the packet in a forwarding table, use the VPN in the hit forwarding entry as the determined VPN in S110, and use an outbound interface in the hit forwarding entry as an outbound interface through which the egress node 104 sends the packet 2' to the server 105 in S111. To improve accuracy of packet forwarding, matching performed by the egress node 104 may be specifically exact matching on the VPN SID in the packet 2' and the VPN SID in the local forwarding table.

It can be learned that, according to the method 100 in this embodiment of this application, the egress node 104 can send the VPN SID corresponding to the egress node 104 to each node in a network, and indicates each node to store the VPN SID of the egress node 104. In this way, the ingress node 102 can sense the VPN SID, and the intermediate node 103 can also sense and store the VPN SID. In comparison with an implementation in which an intermediate node does not store and sense a VPN SID in a conventional service scenario such as an SRv6 BE network, when a VPN service is supported by using the solution provided in this embodiment of this application, because each node stores the VPN SID of the egress node 104, each node can associate the VPN SID with a forwarding entry of a VPN service to be provisioned in a forwarding table, to implement VPN route convergence. In addition, the VPN SID may be diffused in an underlay network. For a packet that is of the VPN corresponding to the VPN SID and that is sent by the user side, both the ingress node 102 and the intermediate node 103 may guide forwarding of the packet based on the locally stored VPN SID, to implement VPN service-level accurate control.

For a network system including a plurality of network topologies, generally, the identifier of the network topology also needs to be diffused to each node in the network system, so that a packet can be forwarded in a specified network topology.

Figure 4:
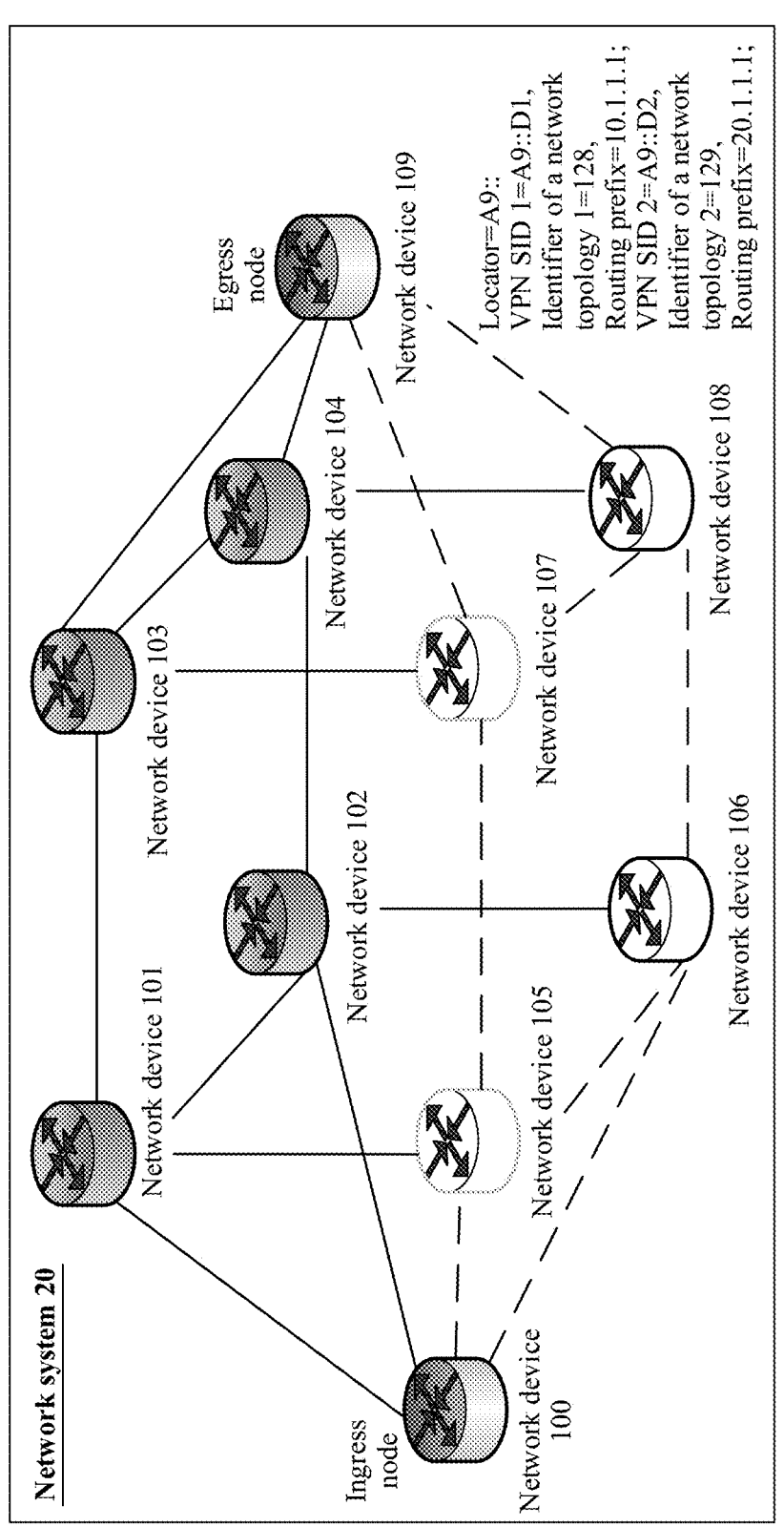
FIG. 4 is a schematic diagram of a structure of a network system 20 according to an embodiment of this application.
Figure 5A:
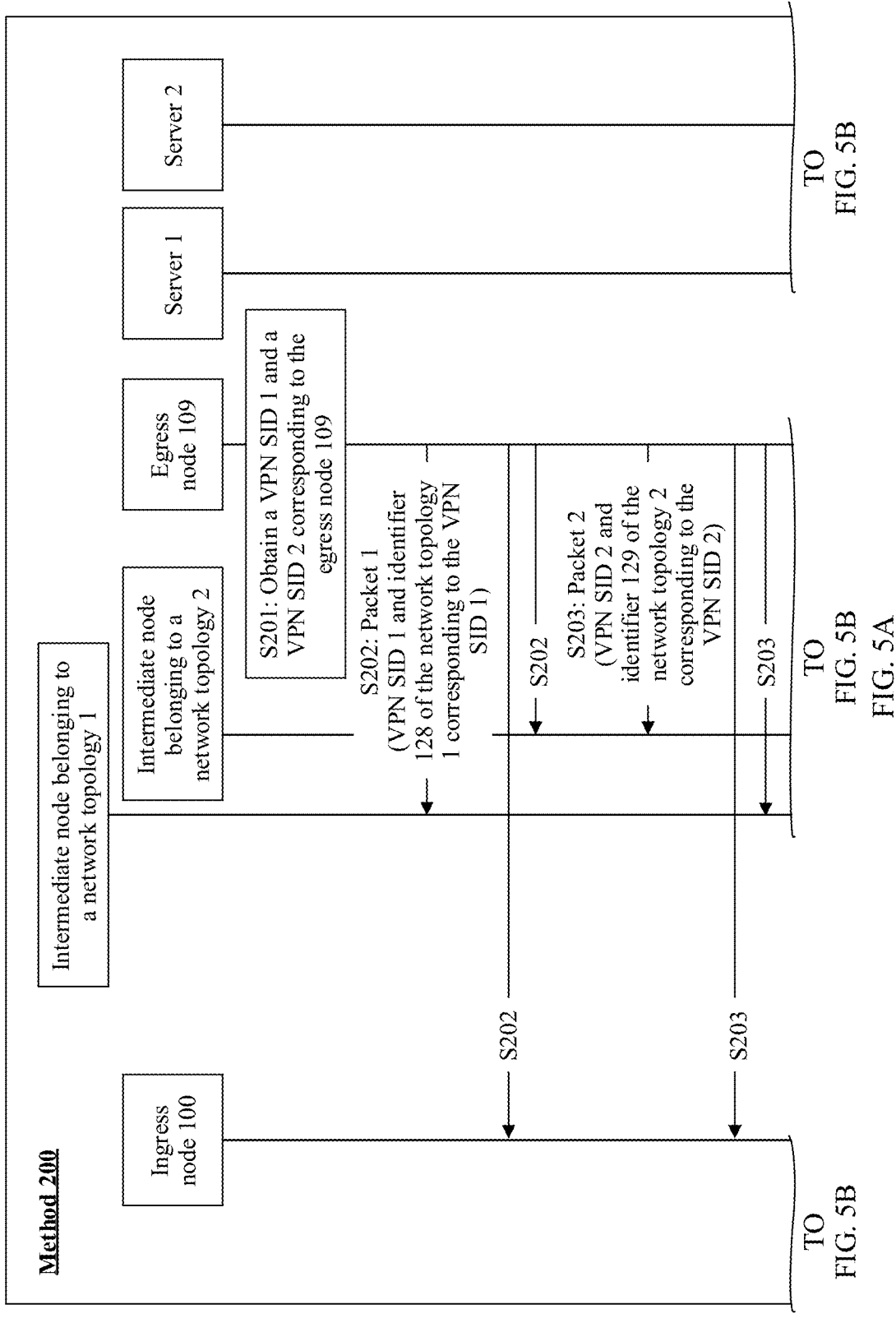
Figure 5D:
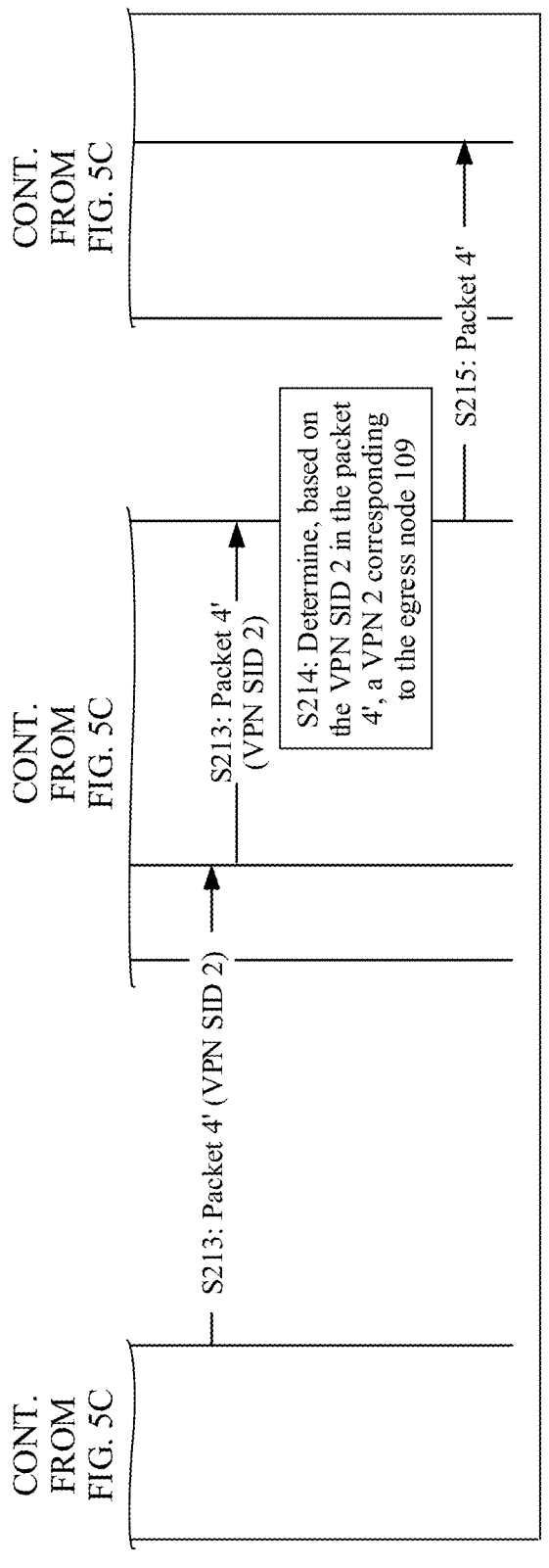

The following network system 20 shown in FIG. 4 is used as an example to describe a method 200 provided in an embodiment of this application. FIG. 4 is a schematic diagram of a structure of a network system 20. The network system 20 may include a network device 100 to a network device 109. It is assumed that the network device 100 is an ingress node, the network device 109 is an egress node, and the network device 101 to the network device 108 are eight intermediate nodes. The network device 100 belongs to a network topology 1 and a network topology 2, the network device 109 also belongs to the network topology 1 and the network topology 2, the network device 101 to the network device 104 belong to the network topology 1, and the network device 105 to the network device 108 belong to the network topology 2.

FIG. 5A to FIG. 5D are a schematic flowchart of a method 200 for transmitting a VPN SID according to an embodiment of this application. The method 200 is described by using interaction between the ingress node 100, the egress node 109, and intermediate nodes. It is assumed that on the egress node 109, a VPN SID 1 corresponding to a routing prefix 10.1.1.1 is configured as A9:: D1, an identifier of a network topology 1 corresponding to the VPN SID 1 is configured as 128, a VPN SID 2 corresponding to a routing prefix 20.1.1.1 is configured as A9:: D2, and an identifier of a network topology 2 corresponding to the VPN SID 2 is configured as 129. During specific implementation, the method 200 may include, for example, the following S201 to S215.

S201: The egress node 109 obtains the VPN SID 1 and the VPN SID 2 corresponding to the egress node 109.

It should be noted that, for an implementation and related description of S201, refer to the corresponding description of S101 in the foregoing method 100.

S202: The egress node 109 sends a packet 1 to another node, where the packet 1 includes the VPN SID 1 and the identifier 128 of the network topology 1 corresponding to the VPN SID 1. The packet 1 indicates each receiver belonging to the network topology 1 to store the VPN SID 1.

The packet 1 may be an IGP packet or a BGP packet. If the packet 1 is a BGP packet, the VPN SID 1 and the identifier 128 of the network topology 1 corresponding to the VPN SID 1 may be carried in an IP unicast address family of the BGP packet. The packet 1 may be sent to the intermediate node 101 to the intermediate node 108 and the ingress node 100 in an intra-domain and outer-domain diffusion manner.

Considering that the network system 20 includes a plurality of network topologies, to overcome problems such as heavy workload and a waste of a network resource caused because one corresponding Locator field is configured for each network topology and a plurality of Locator fields need to be planned and configured for each node, and to enable each node to sense a network topology corresponding to a VPN SID and effectively forward a packet in a specified network topology to better support running of a VPN service, in this embodiment of this application, an identifier of the network topology corresponding to the VPN SID is carried in a packet for diffusing the VPN For example, the egress node 109 may include, in a field that carries the VPN SID 1 in the packet 1, the identifier of the network topology 1 corresponding to the VPN SID 1. Assuming that the packet 1 is an IGP packet, the identifier of the network topology 1 may be carried in the Algorithm field in the sub-TLV field that is shown in FIG. 3a and that is used to carry the VPN SID 1, and a value of the Algorithm field may be the identifier 128 of the network topology 1 corresponding to the VPN SID 1. Assuming the packet 1 is a BGP packet, the identifier of the network topology 1 may be carried in the NLRI 1 that is shown in FIG. 3b and that is used to advertise a public network route. Specifically, the identifier 128 of the network topology 1 corresponding to the VPN SID 1 may be carried in an Algorithm field that is in an extended sub-TLV field of the NLRI 1 and that is used to carry the sub-TLV field in the VPN SID 1. In addition, the VPN SID 1 and the identifier of the network topology 1 corresponding to the VPN SID 1 may be carried in any other possible location of the packet 1. This is not specifically limited in this embodiment of this application.

S203: The egress node 109 sends a packet 2 to another node, where the packet 2 includes the VPN SID 2 and the identifier 129 of the network topology 2 corresponding to the VPN SID 2. The packet 2 indicates each receiver belonging to the network topology 2 to store the VPN SID 2.

Similarly, the packet 2 may be an IGP packet or a BGP packet. If the packet 2 is a BGP packet, the VPN SID 2 and the identifier 129 of the network topology 2 corresponding to the VPN SID 2 may be carried in an IP unicast address family of the BGP packet. The packet 1 may be sent to the intermediate node 101 to the intermediate node 108 and the ingress node 100 in an intra-domain and outer-domain diffusion manner.

For example, if the packet 2 is an IGP packet, the identifier of the network topology 2 may be carried in the Algorithm field in the sub-TLV field that is used to carry the VPN SID 2 and that is shown in FIG. 3a, and a value of the Algorithm field may be the identifier 129 of the network topology 2 corresponding to the VPN SID 2. For another example, if the packet 2 is a BGP packet, the identifier of the network topology 2 may be carried in the NLRI 1 that is shown in FIG. 3b and that is used to advertise a public network route. Specifically, the identifier 129 of the network topology 2 corresponding to the VPN SID 2 may be carried in an Algorithm field that is in an extended sub-TLV field in the NLRI 1 and that is used to carry the sub-TLV field in the VPN SID 2. In addition, the VPN SID 2 and the identifier of the network topology 2 corresponding to the VPN SID 2 may be carried in any other possible location of the packet 2. This is not specifically limited in this embodiment of this application.

S204: The ingress node 100 and the intermediate node 101 to the intermediate node 104 store the VPN SID 2 in the packet 1 and the identifier 128 of the network topology 1 corresponding to the VPN SID 2.

In S202, all nodes in the network system 20 may finally receive the packet 1. After receiving the packet 1, each node matches the identifier of the network topology 1 in the packet 1 with an identifier of a locally configured network topology. A node that succeeds in matching stores the packet 1, and a node that fails in matching does not store the packet 1. Because the identifier of the network topology 1 is configured on the ingress node 100 and the intermediate node 101 to the intermediate node 104, the ingress node 100 and the intermediate node 101 to the intermediate node 104 store the packet 1, and the intermediate node 105 to the intermediate node 108 do not store the packet 1.

During specific implementation, a type of an operation performed by the ingress node 100 and the intermediate node 101 to the intermediate node 104 on the received packet 1 is described by using an operation performed after the ingress node 100 receives the packet 1 as an example. After receiving the packet 1 sent by the egress node 109, the ingress node 100 obtains, through parsing, the VPN SID 1 and the identifier 128 of the network topology 1 carried in the packet 1. In this case, the ingress node 100 may store the VPN SID 1 and 128. The ingress node 100 stores the VPN SID 1 and 128, for example, may generate a forwarding entry 1' based on the VPN SID 1 and 128, where the forwarding entry 1' is used to guide processing of a packet corresponding to a VPN 1 identified by the VPN SID 1. In an example, the generated private network forwarding entry 1' may be shown in the following Table 7:

TABLE 7

| Forwarding entry 1' | |
| --- | --- |
| Route Route | Next hop Next-hop |
| 10.1.1.1 | A9::D1 |

The route indicates an address of a destination device, namely, 10.1.1.1. The next hop indicates an IP address of a next-hop node, namely, the VPN SID 1 of the egress node 109.

In addition, the ingress node 100 may further generate a forwarding entry 2' based on the packet 1, and the forwarding entry 2' belongs to a public network forwarding table. The forwarding entry 2' may include at least a correspondence between the route, the identifier of the network topology, and the next-hop. For example, refer to the following Table 8:

TABLE 8

| Forwarding entry 2' | | |
| --- | --- | --- |
| Route Route | Identifier of a network topology | Next hop Next-hop |
| A9::D1 | 128 | Outbound interface 1 to the intermediate node 101 |

The route indicates a public network IP address of the egress node 109, namely, the VPN SID 1 of the egress node 109. The next hop indicates an outbound interface of a next-hop node, namely, the outbound interface 1 from the ingress node 100 to the intermediate node 101. The outbound interface 1 may be, for example, a physical outbound interface. It should be noted that, if the packet 1 is an IGP packet, the VPN SIDs 1 in Table 7 and Table 8 may come from a same field in the IGP packet. If the packet 1 is a BGP packet, the VPN SID 1 included in Table 7 may come from NLRI that is in the packet 1 and that is used to advertise a private network route, for example, the NLRI 2 from the BGP packet shown in FIG. 3b. The VPN SID 1 included in Table 2 may come from NLRI that is in the packet 1 and that is used to advertise a public network route, for example, the NLRI 1 from the BGP packet shown in FIG. 3b.

The forwarding entry generated by the ingress node 100 based on the packet 1 may alternatively be a forwarding entry 3' shown in the following Table 9:

TABLE 9

| Forwarding entry 3' | | | |
| --- | --- | --- | --- |
| Route Route | Next hop Next-hop | Identifier of a network topology | Outbound interface Out-interface |
| 10.1.1.1 | A9::D1 | 128 | Outbound interface 1 to the intermediate node 101 |

The next hop indicates the VPN SID 1 of the egress node 109. It should be noted that, before generating the forwarding entry, the ingress node 100 may further compare the VPN SID 1 in the NLRI that is used to advertise the public network route and that is in the packet 1 with the VPN SID 1 in the NLRI that is used to advertise the private network route and that is in the packet 1. When a comparison result indicates that the two VPN SIDs 1 are consistent, the ingress node 100 generates the forwarding entry 3' based on the packet 1, and next-hop content in the forwarding entry 3' is the consistent VPN SID 1.

In a possible case, a node that receives the packet 1 obtains the VPN SID 1 of the egress node 109 and the identifier 128 of the network topology 1 corresponding to the VPN SID 1 from the packet 1, and may further generate a forwarding entry prior to another packet that does not carry the VPN SID and that is used to advertise a route, to implement preferential VPN route convergence.

In this way, both the ingress node 100 and the nodes belonging to the network topology 1 store the VPN SID 1 corresponding to the egress node 109 and the identifier 128 of the network topology 1 corresponding to the VPN SID 1, to prepare the nodes belonging to the network topology 1 for processing a packet received from a user side, that is, after S204, the following S206 to S210 may be performed.

S205: The ingress node 100 and the intermediate node 105 to the intermediate node 108 store the VPN SID 2 in the packet 2 and the identifier 129 of the network topology 2 corresponding to the VPN SID 2.

In S203, all nodes in the network system 20 may finally receive the packet 2 sent by the egress node 109. After receiving the packet 2, each node matches the identifier of the network topology 2 in the packet 2 with an identifier of a locally configured network topology. A node that succeeds in matching stores the packet 2, and a node that fails in matching does not store the packet 2. Because the identifier of the network topology 2 is configured on the ingress node 100 and the intermediate node 105 to the intermediate node 108, the ingress node 100 and the intermediate node 105 to the intermediate node 108 store the packet 2, and the intermediate node 101 to the intermediate node 104 do not store the packet 2.

During specific implementation, a type of an operation performed by the ingress node 100 and the intermediate node 105 to the intermediate node 107 on the received packet 2 is described by using an operation performed after the intermediate node 105 receives the packet 2 as an example. After receiving the packet 2 sent by the egress node 109, the intermediate node 105 obtains, through parsing, the VPN SID 2 and the identifier 129 of the network topology 2 carried in the packet 2. In this case, the intermediate node 105 may store the VPN SID 2 and 129. The intermediate node 105 stores the VPN SID 2 and 129, for example, may generate a forwarding entry 4' based on the VPN SID 2 and 129, where the forwarding entry 4' is used to guide processing of a packet corresponding to a VPN 2 identified by the VPN SID 2. In an example, the generated private network forwarding entry 4' may be shown in the following Table 10:

TABLE 10

| Forwarding entry 4' | |
| --- | --- |
| Route Route | Next hop Next-hop |
| 20.1.1.1 | A9::D2 |

The route indicates an address of a destination device, namely, 20.1.1.1. The next hop indicates an IP address of a next-hop node, namely, the VPN SID 2 of the egress node 109.

In addition, the intermediate node 105 may further generate a forwarding entry 5' based on the packet 2, and the forwarding entry 5' belongs to a public network forwarding table. The forwarding entry 5' may include at least a correspondence between the route, the identifier of the network topology, and the next-hop. For example, refer to the following Table 11:

TABLE 11

| Forwarding entry 5' | | |
| --- | --- | --- |
| Route Route | Identifier of a network topology | Next hop Next-hop |
| A9::D2 | 129 | Outbound interface 2 to the intermediate node 107 |

The route indicates a public network IP address of the egress node 109, namely, the VPN SID 2 of the egress node 109. The next hop indicates an outbound interface of a next-hop node, namely, the outbound interface 2 from the intermediate node 105 to the intermediate node 107. The outbound interface 2 may be, for example, a physical outbound interface. It should be noted that, if the packet 2 is an IGP packet, the VPN SIDs 2 in Table 10 and Table 11 may come from a same field in the IGP packet. If the packet 2 is a BGP packet, the VPN SID 2 included in Table 10 may come from NLRI that is in the packet 2 and that is used to advertise a private network route, for example, the NLRI 2 from the BGP packet shown in FIG. 3*b*. The VPN SID 2 included in Table 11 may come from NLRI that is in the packet 1 and that is used to advertise a public network route, for example, the NLRI 1 from the BGP packet shown in FIG. 3*b*.

The forwarding entry generated by the intermediate node 105 based on the packet 2 may alternatively be a forwarding entry 6' shown in the following Table 12:

TABLE 12

| Forwarding entry 6' | | | |
| --- | --- | --- | --- |
| Route Route | Next hop Next-hop | Identifier of a network topology | Outbound interface Out-interface |
| 20.1.1.1 | A9::D2 | 129 | Outbound interface 2 to the intermediate node 107 |

The next hop indicates the VPN SID 2 of the egress node 109. It should be noted that, before generating the forwarding entry, the intermediate node 105 may further compare the VPN SID 2 in the NLRI that is used to advertise the public network route and that is in the packet 2 with the VPN SID 2 in the NLRI that is used to advertise the private network route and that is in the packet 2. When a comparison result indicates that the two VPN SIDs 2 are consistent, the intermediate node 105 generates the forwarding entry 6' based on the packet 2, and next-hop content in the forwarding entry 6' is the consistent VPN SID 2.

In a possible case, a node that receives the packet 2 obtains the VPN SID 2 of the egress node 109 and the identifier 129 of the network topology 2 corresponding to the VPN SID 2 from the packet 2, and may further generate a forwarding entry prior to another packet that does not carry the VPN SID and that is used to advertise a route, to implement preferential VPN route convergence.

In this way, both the ingress node 100 and the nodes belonging to the network topology 2 store the VPN SID 2 corresponding to the egress node 109 and the identifier 129 of the network topology 2 corresponding to the VPN SID 2, to prepare the nodes belonging to the network topology 2 for processing a packet received from a user side, that is, after S205, the following S211 to S215 may be performed.

S206: The ingress node 100 receives a packet 3 from the user side, where a destination address of the packet 3 matches a routing prefix 10.1.1.1.

S207: The ingress node 100 determines that the packet 3 corresponds to the VPN 1 corresponding to the locally stored VPN SID 1, and adds the VPN SID 1 to the packet 3 to obtain a packet 3'. The VPN SID 1 indicates the intermediate node on a forwarding path of the packet 3' to determine, based on matching between the local VPN SID 1 and the VPN SID 1 in the packet 3', a next-hop node that receives the packet 3'.

S208: The ingress node 100 sends the packet 3' to the egress node 109 through a part of nodes of the intermediate node 101 to the intermediate node 104, where the packet 3' includes the VPN SID 1.

After receiving the packet 3, the ingress node 100 may obtain the destination address of the packet 3 through parsing the packet 3. In this case, the ingress node 100 may match the destination address of the packet 3 with a routing prefix in each forwarding entry in a local forwarding table. Once a forwarding entry is hit, the ingress node 100 can process the packet 3 based on the forwarding entry.

In an example, it is assumed that the ingress node 100 stores a forwarding table 1' and a forwarding table 2', and the forwarding table 1' and the forwarding table 2' respectively include the forwarding entry 1' shown in Table 7 and the forwarding entry 2' shown in Table 8. When the ingress node 100 receives the packet 3 and determines that the destination address carried in the packet 3 matches the routing prefix 10.1.1.1 in the forwarding entry 1', the ingress node 100 may add a next hop A9:: D1 in the forwarding entry 1' to the packet 3 to obtain the packet 3', where A9:: D1 (namely, the VPN SID 1 corresponding to the egress node 109) is used by another node on the transmission path to determine, based on matching between the local VPN SID and A9:: D1 in the packet 3', a next-hop node that receives the packet 3'. The ingress node 100 may further match the next hop A9:: D1 in the forwarding entry 1' with a route of each routing entry in the local forwarding table 2', and determine that the route A9:: D1 in the forwarding entry 2' is hit. In this case, the ingress node 100 may determine that an outbound interface for transmitting the packet 3 (or the packet 3') to the next hop (namely, the intermediate node 101) in the network topology 1 is the outbound interface 1. To be specific, the ingress node 100 determines, based on the forwarding entry 2', that the packet 3' should be forwarded to the intermediate node 101 through the outbound interface 1.

In another example, it is assumed that the ingress node 100 stores a forwarding table 3', and the forwarding table 3' includes the forwarding entry 3' shown in Table 9. When the ingress node 100 receives the packet 3 and determines that the destination address carried in the packet 3 matches the routing prefix 10.1.1.1 in the forwarding entry 3', the ingress node 100 may add a next hop A9:: D1 in the forwarding entry 3' to the packet 3 to obtain the packet 3', where A9:: D1 (namely, the VPN SID 1 corresponding to the egress node 109) is used by another node on the transmission path to determine, based on matching between the local VPN SID and A9:: D1 in the packet 3', a next-hop node that receives the packet 3'. The ingress node 100 may further determine, based on the forwarding entry 3', that an outbound interface for transmitting the packet 3 (or the packet 3') to the next hop (namely, the intermediate node 101) in the network topology 1 is the outbound interface 1. To be specific, the ingress node 100 determines, based on the forwarding entry 3', that the packet 3' should be forwarded to the intermediate node 101 through the outbound interface 1.

The ingress node 100 adds the VPN SID 1 to the packet 3, for example, may set the VPN SID 1 to be the DA of the packet 3, to obtain the packet 3'.

After receiving the packet 3', the intermediate node 101 and another node that belongs to the network topology 1 and through which the packet 3' passes may determine, based on matching between the local VPN SID 1 and the VPN SID 1 in the packet 3', a next-hop node that receives the packet 3', and determine that the packet 3' needs to be transmitted between nodes that belong to the network topology 128.

S209: The egress node 109 determines, based on the VPN SID 1 in the packet 3', the VPN 1 corresponding to the egress node 109.

S210: The egress node 109 sends the packet 3' to a server 1 corresponding to the determined VPN 1.

It should be noted that, for an implementation and related description of S209 and S210, refer to the corresponding description of S110 and S111 in the foregoing method 100.

It should be noted that the foregoing S206 to S210 need to be performed after S204, and execution of S206 to S210 and execution of S203 and S205 do not affect each other.

S211: The ingress node 100 receives a packet 4 from the user side, where a destination address of the packet 4 matches the routing prefix 20.1.1.1.

S212: The ingress node 100 determines that the packet 4 corresponds to the VPN 2 corresponding to the locally stored VPN SID 2, and adds the VPN SID 2 to the packet 4 to obtain a packet 4'. The VPN SID 2 indicates the intermediate node on a forwarding path of the packet 4' to determine, based on matching between the local VPN SID 2 and the VPN SID 2 in the packet 4', a next-hop node that receives the packet 4'.

S213: The ingress node 100 sends the packet 4' to the egress node 109 through a part of nodes of the intermediate node 105 to the intermediate node 108, where the packet 4' includes the VPN SID 2.

After receiving the packet 4, the ingress node 100 may obtain the destination address of the packet 4 through parsing the packet 4. In this case, the ingress node 100 may match the destination address of the packet 4 with a routing prefix in each forwarding entry in a local forwarding table. Once a forwarding entry is hit, the ingress node 100 can process the packet 4 based on the forwarding entry.

Assuming that the ingress node 100 stores a forwarding entry including the VPN SID 2 and 129, when the ingress node 100 receives the packet 4 and determines that the destination address carried in the packet 4 matches the routing prefix 20.1.1.1 in the forwarding entry, the ingress node 100 may add a next hop A9:: D2 in the forwarding entry to the packet 4 to obtain the packet 4', where A9:: D2 (namely, the VPN SID 2 corresponding to the egress node 109) is used by another node on the transmission path to determine, based on matching between the local VPN SID and A9:: D2 in the packet 4', the next-hop node that receives the packet 4'. The ingress node 100 may further determine the identifier 129 of the network topology and an outbound interface 3 in the forwarding entry, so that the ingress node 100 determines to forward the packet 4' through the outbound interface 3 to the intermediate node 105 in the network topology 129.

The ingress node 100 adds the VPN SID 2 to the packet 4, for example, may set the VPN SID 2 to be the DA of the packet 4, to obtain the packet 4'.

For example, it is assumed that the intermediate node 105 stores a forwarding table 5', and the forwarding table 5' includes the forwarding entry 5' shown in Table 11. In this case, when the intermediate node 105 receives the packet 4' and determines that the VPN SID indicated by a DA field in the packet 4' matches the routing prefix A9:: D2 in the forwarding entry 5', the intermediate node 105 may determine, based on the forwarding entry 5', that an outbound interface for transmitting the packet 4' to the next hop (namely, the intermediate node 107) is the outbound interface 2. To be specific, the intermediate node 105 determines, based on the forwarding entry 5', that the packet 4' should be forwarded through the outbound interface 2 to the intermediate node 107. Optionally, the intermediate node 105 may further store a forwarding table 4', and the forwarding table 4' includes the forwarding entry 4' shown in Table 10. Therefore, before forwarding the packet 4', to ensure reliability of a forwarding operation, the intermediate node 105 may further compare VPN SIDs in the forwarding entry 4' and the forwarding entry 5'. If the VPN SIDs are the same, the intermediate node 105 forwards the packet 4' based on next-hop content in the forwarding entry 5'. Otherwise, it is considered that the VPN SID in the forwarding entry 5' or the VPN SID in the packet 4' is incorrect, and the intermediate node 105 does not process the packet 4'.

For another example, it is assumed that the intermediate node 105 stores a forwarding table 6', and the forwarding table 6' includes the forwarding entry 6' shown in Table 12. In this case, when the intermediate node 105 receives the packet 4' and determines that the VPN SID indicated by a DA field in the packet 4' matches the next hop A9:: D2 in the forwarding entry 6', the intermediate node 105 may determine, based on the forwarding entry 6', that an outbound interface for transmitting the packet 4' to the next hop (namely, the intermediate node 107) is the outbound interface 2. To be specific, the intermediate node 105 determines, based on the forwarding entry 6', that the packet 4' should be forwarded through the outbound interface 2 to the intermediate node 107.

It should be noted that, after receiving the packet 4', the intermediate node 107 and another node that belongs to the network topology 2 and through which the packet 4' passes may determine, based on matching between the local VPN SID 2 and the VPN SID 2 in the packet 4', a next-hop node that receives the packet 4', and determine that the packet 4' needs to be transmitted between nodes that belong to the network topology 129.

S214: The egress node 109 determines, based on the VPN SID 2 in the packet 4', a VPN 2 corresponding to the egress node 109.

S215: The egress node 109 sends the packet 4' to a server 2 corresponding to the determined VPN 2.

It should be noted that, for an implementation and related description of S214 and S215, refer to the corresponding description of S110 and S111 in the foregoing method 100.

It should be noted that the foregoing S211 to S215 need to be performed after S205, and execution of S211 to S215 and execution of S202 and S204 do not affect each other.

In the method 200, S201, S202, S204, and S206 to S210 may be performed, S201, S203, S205, and S211 to S215 may be performed, or S201 to S215 may be performed.

The plurality of network topologies mentioned in the method 200 may be obtained by planning the network system by using a specific algorithm. An algorithm for planning the network system as different network topologies may be, for example, a flexible algorithm (FlexAlgo), or may be any other algorithm that can be used to plan different network topologies. This is not specifically limited in this embodiment of this application.

To improve accuracy of packet forwarding, or match a service rule or a forwarding entry at a finer granularity to implement VPN service-level accurate forwarding control, or the like, matching between a local VPN SID and a VPN SID carried in a packet mentioned in this embodiment of this application may be specifically exact matching. It can be learned that according to the method 200 provided in this embodiment of this application, the egress node 109 can send the VPN SID corresponding to the egress node 109 and the identifier of the network topology corresponding to the VPN SID to each node in a network, and indicate each node to correspondingly store the VPN SID and the identifier of the network topology of the egress node 109. In this way, the ingress node 100 can sense the VPN SID and the network topology corresponding to the VPN SID, and the intermediate node can also sense and store the VPN SID and the network topology corresponding to the VPN SID. When a VPN service needs to be provisioned, each node stores the VPN SID of the egress node 109, to enable each node to associate the VPN SID with a forwarding entry of the VPN service to be provisioned in a forwarding table, to implement VPN route convergence. In addition, for a packet that is of a VPN corresponding to the VPN SID and that is sent by the user side, both the ingress node 100 and each intermediate node can guide accurate forwarding of the packet in a specified network topology based on a locally stored VPN SID, to implement refined VPN service-level control.

Based on the foregoing method embodiments, an embodiment of this application provides an apparatus for transmitting a VPN SID. The following describes the apparatus with reference to the accompanying drawings.

Figure 6:
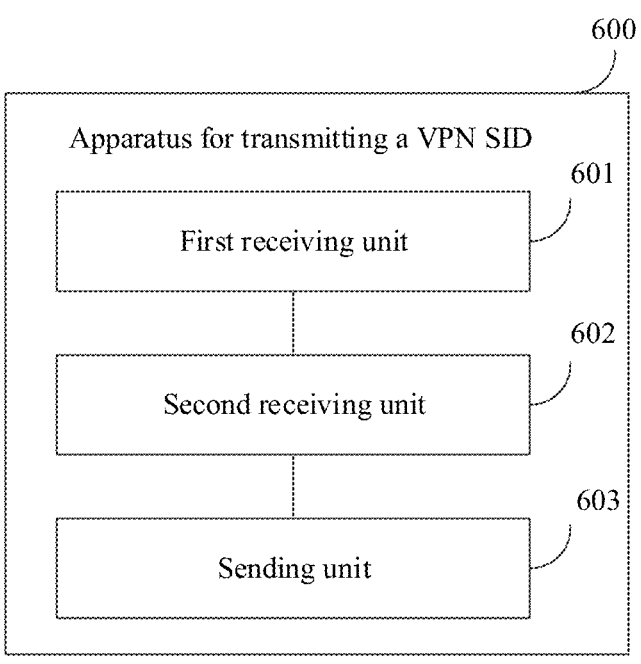
FIG. 6 is a schematic diagram of a structure of an apparatus 600 for transmitting a VPN SID according to an embodiment of this application.

FIG. 6 is a schematic diagram of a structure of an apparatus 600 for transmitting a VPN SID according to an embodiment of this application. The apparatus 600 is used for an ingress node, for example, may perform a function of the ingress node 102 in the embodiment shown in FIG. 2, or for another example, may perform a function of the ingress node 100 in the embodiment shown in FIG. 5A to FIG. 5D. The apparatus 600 may include a first receiving unit 601, a second receiving unit 602, and a sending unit 603.

The first receiving unit 601 is configured to receive a first packet, where the first packet includes a virtual private network segment identifier VPN SD.

When the apparatus 600 is used for the ingress node 102 shown in FIG. 2, for a specific implementation of receiving the first packet by the first receiving unit 601, refer to S103 in the embodiment shown in FIG. 2. When the apparatus 600 is used for the ingress node 100 shown in FIG. 5A to FIG. 5D, for a specific implementation of receiving the first packet by the first receiving unit 601, refer to S204 or S205 in the embodiment shown in FIG. 5A to FIG. 5D.

The second receiving unit 602 is configured to receive a second packet of a VPN corresponding to the VPN SID from a user side, and add the VPN SID to the second packet to obtain an updated second packet. The VPN SID indicates a first intermediate node on a forwarding path of the updated second packet to determine, based on matching between a local VPN SID and the VPN SID in the updated second packet, a second intermediate node or an egress node that receives the updated second packet.

When the apparatus 600 is used for the ingress node 102 shown in FIG. 2, for a specific implementation of receiving the second packet by the second receiving unit 602, refer to S106 in the embodiment shown in FIG. 2. When the apparatus 600 is used for the ingress node 100 shown in FIG. 5A to FIG. 5D, for a specific implementation of receiving the second packet by the second receiving unit 602, refer to S207 or S212 in the embodiment shown in FIG. 5A to FIG. 5D.

The sending unit 603 is configured to send the updated second packet.

When the apparatus 600 is used for the ingress node 102 shown in FIG. 2, for a specific implementation of sending the updated second packet by the sending unit 603, refer to S107 in the embodiment shown in FIG. 2. When the apparatus 600 is used for the ingress node 100 shown in FIG. 5A to FIG. 5D, for a specific implementation of sending the updated second packet by the sending unit 603, refer to S208 or S213 in the embodiment shown in FIG. 5A to FIG. 5D.

In an embodiment, if the first packet further includes an address of a destination device, the second receiving unit 602 may include a first receiving subunit and an adding subunit. The first receiving subunit is configured to receive the second packet, where the second packet carries the address of the destination device. The adding subunit is configured to add the VPN SID to a destination address field of a packet header of the second packet based on a correspondence between the address of the destination device carried in the second packet and the VPN In an embodiment, the first packet is a BGP packet, and the VPN SID is carried in an IP unicast address family of the BGP packet. Alternatively, the first packet is an IGP packet.

In an embodiment, the first packet further includes an address of a destination device, and the apparatus 600 further includes a generation unit. The generation unit is configured to generate a first forwarding entry based on the first packet, where the first forwarding entry includes a correspondence between the VPN SID and the address of the destination device.

In an embodiment, the apparatus 600 further includes a third receiving unit. The third receiving unit is configured to receive a third packet, where the third packet does not include the VPN SID. In this case, the generation unit is specifically configured to: determine, based on the VPN SID included in the first packet, to generate the first forwarding entry prior to a second forwarding entry, where the second forwarding entry is a forwarding entry generated based on the third packet.

In an embodiment, the VPN SID specifically indicates the first intermediate node to perform exact matching based on the locally stored VPN SID and the VPN SID in the updated second packet, to determine the second intermediate node or the egress node that receives the updated second packet.

In an embodiment, the first packet further includes an identifier of a network topology corresponding to the VPN SID. In this case, the sending unit 603 is specifically configured to: determine, based on the VPN SID corresponding to the second packet, the identifier of the network topology corresponding to the VPN SID, and send the updated second packet to another node, where the another node is an intermediate node in the network topology indicated by the identifier of the network topology. The identifier of the network topology may be carried by using a TLV field defined in a field that is in the first packet and that is used to carry the VPN SID. For example, the identifier of the network topology may be a FlexAlgo identifier.

For a specific executable function and implementation of the apparatus 600 for transmitting the VPN SID, refer to the corresponding description about the ingress node 102 in the embodiment shown in FIG. 2, or refer to the corresponding description about the ingress node 100 in the embodiment shown in FIG. 5A to FIG. 5D. Details are not described herein again.

Figure 7:
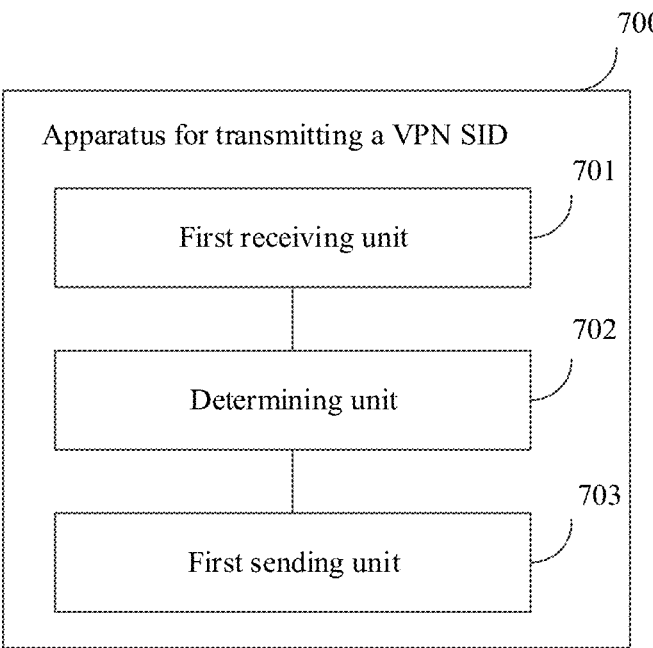
FIG. 7 is a schematic diagram of a structure of an apparatus 700 for transmitting a VPN SID according to an embodiment of this application.

FIG. 7 is a schematic diagram of a structure of an apparatus 700 for transmitting a VPN SID according to an embodiment of this application. The apparatus 700 is used for a first intermediate node, for example, may perform a function of the intermediate node 103 in the embodiment shown in FIG. 2, or for another example, may perform a function of any intermediate node in the network topology 1 or any intermediate node in the network topology 2 in the embodiment shown in FIG. 5A to FIG. 5D. The apparatus 700 may include a first receiving unit 701, a determining unit 702, and a first sending unit 703.

The first receiving unit 701 is configured to receive a second packet from an ingress node, where the second packet includes a virtual private network segment identifier VPN SD.

When the apparatus 700 is used for the intermediate node 103 shown in FIG. 2, for a specific implementation of receiving the second packet by the first receiving unit 701, refer to S107 in the embodiment shown in FIG. 2. When the apparatus 700 is used for any intermediate node in the network topology 1 or any intermediate node in the network topology 2 shown in FIG. 5A to FIG. 5D, for a specific implementation of receiving the second packet by the first receiving unit 701, refer to S208 or S213 in the embodiment shown in FIG. 5A to FIG. 5D.

The determining unit 702 is configured to determine, based on matching between a local VPN SID and the VPN SID in the second packet, a next-hop node that receives the second packet, where the next-hop node is a second intermediate node or an egress node.

When the apparatus 700 is used for the intermediate node 103 shown in FIG. 2, for a specific implementation of determining the next-hop node by the determining unit 702, refer to S108 in the embodiment shown in FIG. 2. When the apparatus 700 is used for any intermediate node in the network topology 1 or any intermediate node in the network topology 2 shown in FIG. 5A to FIG. 5D 5, for a specific implementation of determining the next-hop node by the determining unit 702, refer to S208 or S213 in the embodiment shown in FIG. 5A to FIG. 5D.

The first sending unit 703 is configured to send the second packet to the next-hop node.

When the apparatus 700 is used for the intermediate node 103 shown in FIG. 2, for a specific implementation of sending the second packet by the first sending unit 703, refer to S109 in the embodiment shown in FIG. 2. When the apparatus 700 is used for any intermediate node in the network topology 1 or any intermediate node in the network topology 2 shown in FIG. 5A to FIG. 5D, for a specific implementation of sending the second packet by the first sending unit 703, refer to S208 or S213 in the embodiment shown in FIG. 5A to FIG. 5D.

In an embodiment, the apparatus 700 further includes a second receiving unit and a storage unit. The second receiving unit is configured to receive a first packet before receiving the second packet from the ingress node, where the first packet includes the VPN SID; and the storage unit is configured to store the VPN SID.

In an embodiment, the apparatus 700 further includes a second sending unit. The second sending unit is configured to forward the first packet to the second intermediate node or the ingress node.

In an embodiment, the first packet may be a BGP packet, and the VPN SID is carried in an IP unicast address family of the BGP packet. Alternatively, the first packet may be an IGP packet.

In an embodiment, the storage unit is specifically configured to: generate and store a first forwarding entry based on the first packet, where the first forwarding entry includes a correspondence between a next-hop node identifier and the VPN SID. In this case, the determining unit 702 includes a first determining subunit and a second determining subunit. The first determining subunit is configured to hit the first forwarding entry based on the VPN SID in the second packet. The second determining subunit is configured to determine, based on the next-hop node identifier in the first forwarding entry, the next-hop node that receives the second packet.

In an embodiment, the apparatus 700 further includes a third receiving unit. The third receiving unit is configured to receive a third packet, where the third packet does not include the VPN SID. In this case, the storage unit is specifically configured to: determine, based on the VPN SID included in the first packet, to generate the first forwarding entry prior to a second forwarding entry, where the second forwarding entry is a forwarding entry generated based on the third packet.

In an embodiment, the determining unit 702 is specifically configured to: determine, based on exact matching between a local VPN SID and the VPN SID in the second packet, a next-hop node that receives the second packet.

In an embodiment, the first packet further includes an identifier of a network topology corresponding to the VPN SID, and the identifier of the network topology indicates the first intermediate node to determine a correspondence between the VPN SID, the next-hop node, and the identifier of the network topology, where the next-hop node is a node in the network topology identified by the identifier of the network topology. The identifier of the network topology may be carried by using a TLV field defined in a field that is in the first packet and that is used to carry the VPN SID. For example, the identifier of the network topology may be a FlexAlgo identifier.

For a specific executable function and implementation of the apparatus 700 for transmitting the VPN SID, refer to the corresponding description about the intermediate node 103 in the embodiment shown in FIG. 2, or refer to the corresponding description of any intermediate node in the network topology 1 or any intermediate node in the network topology 2 in the embodiment shown in FIG. 5A to FIG. 5D. Details are not described herein again.

Figure 8:
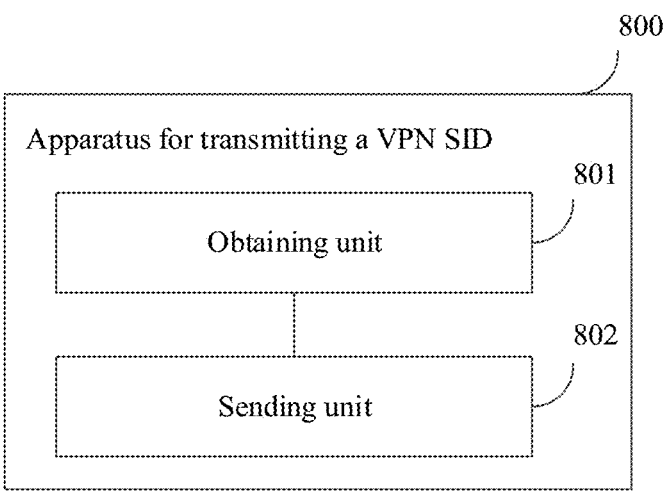
FIG. 8 is a schematic diagram of a structure of an apparatus 800 for transmitting a VPN SID according to an embodiment of this application.

FIG. 8 is a schematic diagram of a structure of an apparatus 800 for transmitting a VPN SID according to an embodiment of this application. The apparatus 800 is used for an egress node, for example, may perform a function of the egress node 104 in the embodiment shown in FIG. 2, or for another example, may perform a function of the egress node 109 in the embodiment shown in FIG. 5A to FIG. 5D. The apparatus 800 may include an obtaining unit 801 and a sending unit 802.

The obtaining unit 801 is configured to obtain the VPN SID corresponding to the egress node.

When the apparatus 800 is used for the egress node 104 shown in FIG. 2, for a specific implementation of obtaining, by the obtaining unit 801, the VPN SID corresponding to the egress node, refer to S101 in the embodiment shown in FIG. 2. When the apparatus 800 is used for the egress node 109 shown in FIG. 5A to FIG. 5D, for a specific implementation of obtaining, by the obtaining unit 801, the VPN SID corresponding to the egress node, refer to S201 in the embodiment shown in FIG. 5A to FIG. 5D.

The sending unit 202 is configured to send a first packet to an intermediate node, where the first packet includes the VPN SID, and the first packet indicates the intermediate node to store the VPN When the apparatus 800 is used for the egress node 104 shown in FIG. 2, for a specific implementation of sending the first packet by the sending unit 802 to the intermediate node, refer to S102 in the embodiment shown in FIG. 2. When the apparatus 800 is used for the egress node 109 shown in FIG. 5A to FIG. 5D, for a specific implementation of sending the first packet by the sending unit 802 to the intermediate node, refer to S202 or S203 in the embodiment shown in FIG. 5A to FIG. 5D.

In an embodiment, the first packet may be a BGP packet, and the VPN SID is carried in an IP unicast address family of the BGP packet. Alternatively, the first packet may be an IGP packet.

In an embodiment, the VPN SID indicates the intermediate node to determine, based on matching between the local VPN SID and the VPN SID in the received second packet, a next-hop node that receives the second packet.

In an embodiment, that the first packet indicates another node to store the VPN SID is specifically that the first packet indicates the intermediate node to generate a first forwarding entry based on the VPN SID, the first forwarding entry includes a correspondence between the VPN SID and a next-hop node identifier, and the first forwarding entry indicates the intermediate node to forward the received second packet to the next-hop node.

In an embodiment, the first packet further includes an identifier of a network topology corresponding to the VPN SID, the first packet indicates the intermediate node to generate the first forwarding entry based on the identifier of the network topology and the VPN SID, the first forwarding entry includes a correspondence between the VPN SID, the next-hop node, and the identifier of the network topology, and the next-hop node is a node in the network topology identified by the identifier of the network topology. The identifier of the network topology may be carried by using a TLV field defined in a field that is in the first packet and that is used to carry the VPN SID. For example, the identifier of the network topology may be a FlexAlgo identifier.

For a specific executable function and implementation of the apparatus 800 for transmitting the VPN SID, refer to the corresponding description about the egress node 104 in the embodiment shown in FIG. 2, or refer to the corresponding description about the egress node 109 in the embodiment shown in FIG. 5A to FIG. 5D. Details are not described herein again.

Figure 9:
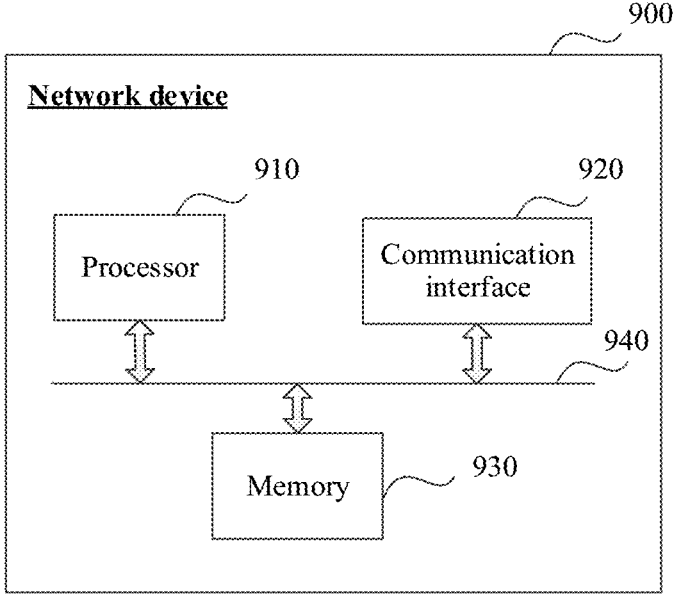
FIG. 9 is a schematic diagram of a structure of a network device 900 according to an embodiment of this application.

FIG. 9 is a schematic diagram of a structure of a network device 900 according to an embodiment of this application. The network device 900 may be, for example, any node in the embodiment shown in FIG. 2 or FIG. 5A to FIG. 5D, or may be a device implementation of the apparatus for transmitting the VPN SID in the embodiment shown in FIG. 7, FIG. 8, or FIG. 9.

Refer to FIG. 9. The network device 900 includes a processor 910, a communication interface 920, and a memory 930. There may be one or more processors 910 in the communication device 900, and FIG. 9 shows one processor as an example. In this embodiment of this application, the processor 910, the communication interface 920, and the memory 930 may be connected by using a bus system or in another manner. In FIG. 9, an example in which a bus system 940 is used for the connection.

The processor 910 may be a CPU, an NP, or a combination of a CPU and an NP. The processor 910 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

When the network device includes the ingress node 102, the processor 910 may perform related functions in the foregoing method embodiments, such as receiving a first packet including a VPN SID, receiving a second packet of a VPN corresponding to the VPN SID from a user side, adding the VPN SID to the second packet to obtain an updated second packet, and sending the updated second packet. When the network device is the intermediate node 103, the processor 910 may perform related functions in the foregoing method embodiments, such as receiving a second packet including a VPN SID from an ingress node, determining, based on matching between a local VPN SID and the VPN SID in the second packet, a next-hop node that receives the second packet, and sending the second packet to the next-hop node. When the network device is the egress node 104, the processor 910 may perform related functions in the foregoing method embodiments, such as obtaining a VPN SID corresponding to the egress node, and sending a first packet including the VPN SID to an intermediate node, where the first packet indicates the intermediate node to store the VPN The communication interface 920 is configured to receive and send a packet. Specifically, the communication interface 920 may include a receiving interface and a sending interface. The receiving interface may be configured to receive a packet, and the sending interface may be configured to send a packet. There may be one or more communication interfaces 920.

The memory 930 may include a volatile memory, for example, a random access memory (RAM). The memory 930 may alternatively include a non-volatile memory, for example, a flash memory, a hard disk drive (HDD), or a solid-state drive (SSD). The memory 930 may further include a combination of the foregoing types of memories. The memory 930 may store, for example, the VPN SID corresponding to the egress node mentioned above.

Optionally, the memory 930 stores an operating system and a program, an executable module, or a data structure, or a subset thereof, or an extended set thereof. The program may include various operation instructions, used to implement various operations. The operating system may include various system programs, to implement various basic services and process a hardware-based task. The processor 910 may read a program in the memory 930, to implement the method for transmitting a VPN SID provided in this embodiment of this application.

The memory 930 may be a storage device in the network device 900, or may be a storage apparatus independent of the network device 900.

The bus system 940 may be a peripheral component interconnect (PCI) bus, an extended industry standard architecture (EISA) bus, and or the like. The bus system 940 may be classified into an address bus, a data bus, a control bus, and the like. For ease of representation, only one thick line is used to represent the bus in FIG. 9, but this does not mean that there is only one bus or only one type of bus.

Figure 10:
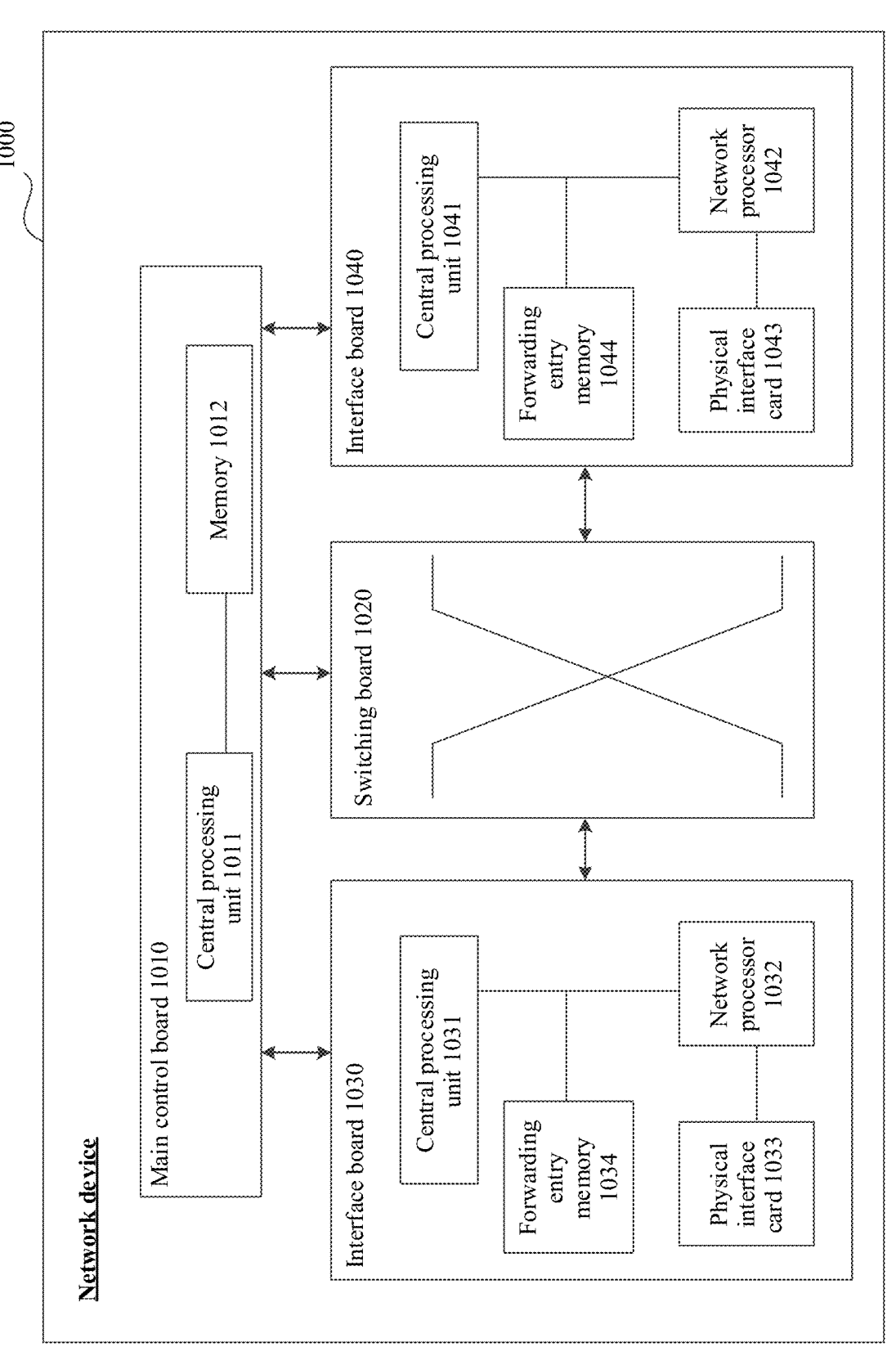
FIG. 10 is a schematic diagram of a structure of a network device 1000 according to an embodiment of this application.

FIG. 10 is another schematic diagram of a structure of a network device 1000 according to an embodiment of this application. The network device 1000 may be configured as any node in the embodiment shown in FIG. 2 or FIG. 5A to FIG. 5D, or may be a device implementation of the apparatus for transmitting the VPN SID in the embodiment shown in FIG. 7, FIG. 8, or FIG. 9.

The network device 1000 includes a main control board 1010 and an interface board 1030.

The main control board 1010 is also referred to as a main processing unit (MPU) or a route processor card. The main control board 1010 controls and manages components in the network device 1000, including functions such as routing calculation, device management, device maintenance, and protocol processing. The main control board 1010 includes a central processing unit 1011 and a memory 1012.

The interface board 1030 is also referred to as a line processing unit (LPU) card, a line card, or a service board. The interface board 1030 is configured to provide various service interfaces and forward a data packet. The service interface includes but is not limited to an Ethernet interface, a POS (Packet over SONET/SDH) interface, and the like. The Ethernet interface is, for example, a flexible Ethernet service interface (Flexible Ethernet Clients, FlexE Clients). The interface board 1030 includes a central processing unit 1031, a network processor 1032, a forwarding entry memory 1034, and a physical interface card (PIC) 1033.

The central processing unit 1031 on the interface board 1030 is configured to control and manage the interface board 1030, and communicate with the central processing unit 1011 on the main control board 1010.

The network processor 1032 is configured to forward a packet. A form of the network processor 832 may be a forwarding chip. Specifically, processing on an uplink packet includes processing at a packet inbound interface and forwarding table searching, and processing on a downlink packet includes forwarding table searching, and the like.

The physical interface card 1033 is configured to implement a physical layer interconnection function. Original traffic enters the interface board 1030 from the physical interface card 1033, and a processed packet is sent out from the physical interface card 1033. The physical interface card 1033 includes at least one physical interface. The physical interface is also referred to as a physical port. The physical interface card 1033, also referred to as a subcard, may be mounted on the interface board 1030, and is responsible for converting an optical/electrical signal into a packet, performing validity check on the packet, and forwarding the packet to the network processor 1032 for processing. In some embodiments, the central processing unit 831 on the interface board 1030 may also perform a function of the network processor 1032, for example, implementing software forwarding based on a general-purpose CPU, so that the network processor 1032 is not required in the physical interface card 1033.

Optionally, the network device 1000 includes a plurality of interface boards. For example, the network device 1000 further includes an interface board 1040, and the interface board 1040 includes a central processing unit 1041, a network processor 1042, a forwarding entry memory 1044, and a physical interface card 1043.

Optionally, the network device 1000 further includes a switching board 1020. The switching board 1020 may also be referred to as a switch fabric unit (switch fabric unit, SFU). When the network device includes a plurality of interface boards 1030, the switching board 1020 is configured to complete data exchange between the interface boards. For example, the interface board 1030 and the interface board 1040 may communicate with each other via the switching board 820.

The main control board 1010 is coupled to the interface board 1030. For example, the main control board 1010, the interface board 1030, the interface board 1040, and the switching board 1020 are connected to a system backboard through a system bus. In this way, interworking is implemented. In an embodiment, an inter-process communication (inter-process communication, IPC) channel is established between the main control board 1010 and the interface board 1030, and the main control board 1010 communicates with the interface board 1030 through the IPC channel.

Logically, the network device 1000 includes a control plane and a forwarding plane. The control plane includes the main control board 1010 and the central processing unit 1031. The forwarding plane includes components that perform forwarding, such as the forwarding entry memory 1034, the physical interface card 1033, and the network processor 1032. The control plane performs functions such as routing, generating a forwarding table, processing signaling and a protocol packet, and configuring and maintaining a device status. The control plane delivers the generated forwarding table to the forwarding plane. On the forwarding plane, based on the forwarding table delivered from the control plane, the network processor 1032 looks up the table, and forwards a packet received by the physical interface card 1033. The forwarding table delivered by the control plane may be stored in the forwarding entry memory 1034. In some embodiments, the control plane and the forwarding plane may be completely separated, and are not on a same device.

If the network device 1000 is configured as the ingress node 102, the central processing unit 1011 may receive a first packet including a VPN SID, receive, from a user side, a second packet of a VPN corresponding to the VPN SID, and add the VPN SID to the second packet to obtain an updated second packet. The network processor 1032 may trigger the physical interface card 1033 to send the updated second packet.

If the network device 1000 is configured as the intermediate node 103, the central processing unit 1011 may receive a second packet including a VPN SID from the ingress node, and determine, based on matching between a local VPN SID and the VPN SID in the second packet, a next-hop node that receives the second packet. The network processor 1032 may trigger the physical interface card 1033 to send the second packet to the next-hop node.

If the network device 1000 is configured as the egress node 104, the central processing unit 1011 may obtain a VPN SID corresponding to the egress node. The network processor 1032 may trigger the physical interface card 1033 to send a first packet including the VPN SID to the intermediate node.

It should be understood that the first receiving unit 601, the second receiving unit 602, the sending unit 603, and the like in the apparatus 600 for transmitting a VPN SID may be equivalent to the physical interface card 1033 or the physical interface card 1043 in the network device 1000. The generation unit and the like in the apparatus 600 for transmitting a VPN SID may be equivalent to the central processing unit 1011 or the central processing unit 1031 in the network device 1000. The first receiving unit 701, the first sending unit 703, and the like in the apparatus 700 for transmitting a VPN SID may be equivalent to the physical interface card 1033 or the physical interface card 1043 in the network device 1000. The determining unit 702 and the like in the apparatus 700 for transmitting a VPN SID may be equivalent to the central processing unit 1011 or the central processing unit 1031 in the network device 1000. The sending unit 802, and the like in the apparatus 800 for transmitting a VPN SID may be equivalent to the physical interface card 1033 or the physical interface card 1043 in the network device 1000. The obtaining unit 801 and the like in the apparatus 800 for transmitting a VPN SID may be equivalent to the central processing unit 1011 or the central processing unit 1031 in the network device 1000.

It should be understood that an operation on the interface board 1040 is consistent with an operation on the interface board 1030 in this embodiment of this application. For brevity, details are not described again. It should be understood that the network device 1000 in this embodiment may correspond to any node in the foregoing method embodiments. The main control board 1010, the interface board 1030, and/or the interface board 1040 in the network device 1000 may implement functions and/or steps implemented by any node in the foregoing method embodiments. For brevity, details are not described herein again.

It should be understood that, there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a weak data exchange and processing capability. Which architecture is specifically used depends on a specific networking deployment scenario.

In some possible embodiments, each node may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine can be configured as nodes. For example, each node may be implemented based on a general-purpose physical server in combination with a network functions virtualization (NFV) technology. Each node is a virtual host, a virtual router, or a virtual switch. By reading this application, persons skilled in the art may obtain, on the general-purpose physical server through virtualization with reference to the NFV technology, the node having the foregoing functions. Details are not described herein.

It should be understood that the network devices in the foregoing product forms separately have any function of the node in the foregoing method embodiments. Details are not described herein.

An embodiment of this application further provides a chip, including a processor and an interface circuit. The interface circuit is configured to receive instructions and transmit the instructions to the processor. The processor, for example, may be in a specific implementation form of the apparatus 600 for transmitting a VPN SID shown in FIG. 6, and may be configured to perform the foregoing method. For another example, the processor may be in a specific implementation form of the apparatus 700 for transmitting a VPN SID shown in FIG. 7, and may be configured to perform the foregoing method. For still another example, the processor may be in a specific implementation form of the apparatus 800 for transmitting a VPN SID shown in FIG. 8, and may be configured to perform the foregoing method. The processor is coupled to a memory, the memory is configured to store a program or instructions, and when the program or the instructions are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on a chip (SoC), a central processing unit (CPU), a network processor (NP), a digital signal processor (DSP), a microcontroller unit (MCU), a programmable logic device (PLD), or another integrated chip.

An embodiment of this application further provides a computer-readable storage medium, including instructions or a computer program. When the instructions or the computer program are/is run on a computer, the computer is enabled to perform the method for transmitting a VPN SID in the foregoing embodiment.

An embodiment of this application further provides a computer program product including instructions or a computer program. When the instructions or the computer program are/is run on a computer, the computer is enabled to perform the method for transmitting a VPN SID in the foregoing embodiment.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, in other words, may be located in one position, or may be distributed on a plurality of network units. Some or all of the units may be selected based on actual needs to achieve the objective of the solutions of the embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

Persons skilled in the art should be aware that, in the foregoing one or more examples, services described in the present invention may be implemented by hardware, software, firmware, or any combination thereof. When the present invention is implemented by the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and beneficial effects of the present invention have been further described in detail in the foregoing specific embodiments. It should be understood that the foregoing description is merely specific embodiments of the present invention.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for transmitting a virtual private network segment identifier (VPN SID), comprising:
   receiving, by an ingress node, a first packet sent from an egress node, wherein the first packet comprises a VPN SID corresponding to the egress node;
   receiving, by the ingress node, a second packet from a user side, wherein the second packet is a VPN service packet, and
   adding the VPN SID to the second packet to obtain an updated second packet, wherein the VPN SID is used as the destination address of the updated second packet, and wherein the VPN SID indicates to a first intermediate node on a forwarding path of the updated second packet to determine, based on matching between a locally stored entry in the first intermediate node and the VPN SID in the updated second packet, a next-hop node that receives the updated second packet, wherein the locally stored entry comprising a correspondence between the VPN SID and the next-hop node, and wherein the next-hop node is a second intermediate node or the egress node; and
   sending, by the ingress node, the updated second packet to the first intermediate node.

2. The method according to claim 1, wherein the adding the VPN SID to the second packet comprises:
   adding, by the ingress node, the VPN SID to a destination address field of a packet header of the second packet based on a correspondence between the address of the destination device carried in the second packet and the VPN SID.

3. The method according to claim 1, wherein the first packet is a border gateway protocol (BGP) packet, and the VPN SID is carried in an internet protocol (IP) unicast address family of the BGP packet; or the first packet is an interior gateway protocol (IGP) packet.

4. The method according to claim 3, wherein the first packet further comprises an address of the destination device, and the method further comprises:

generating, by the ingress node, a first forwarding entry based on the first packet, wherein the first forwarding entry comprises a correspondence between the VPN SID and the address of the destination device.

5. The method according to claim 4, wherein the method further comprises:

receiving, by the ingress node, a third packet, wherein the third packet does not comprise the VPN SID; and the generating, by the ingress node, a first forwarding entry based on the first packet comprises:

determining, by the ingress node based on the VPN SID comprised in the first packet, to generate the first forwarding entry prior to a second forwarding entry, wherein the second forwarding entry is a forwarding entry generated based on the third packet.

6. The method according to claim 1, wherein the VPN SID indicates to the first intermediate node to perform exact matching based on the VPN SID in the locally stored entry and the VPN SID in the updated second packet, to determine the second intermediate node or the egress node that receives the updated second packet.

7. The method according to claim 1, wherein the first packet further comprises an identifier of a network topology corresponding to the VPN SID.

8. The method according to claim 7, wherein the sending, by the ingress node, the updated second packet comprises:

determining, by the ingress node based on the VPN SID corresponding to the second packet, the identifier of the network topology corresponding to the VPN SID, and sending the updated second packet to another node, wherein the another node is an intermediate node in the network topology indicated by the identifier of the network topology.

9. A method for transmitting a virtual private network segment identifier (VPN SID), comprising:

receiving, by a first intermediate node, a first packet sent from an egress node, wherein the first packet comprises a VPN SID corresponding to the egress node;

storing, by the first intermediate node, an entry comprising a correspondence between the VPN SID and a next-hop node, the next-hop node is a second intermediate node or the egress node;

receiving, by the first intermediate node, a second packet from an ingress node, wherein the second packet comprises the VPN SID which is used as the destination address of the second packet;

determining, by the first intermediate node based on matching between the stored entry and the VPN SID in the second packet, a next-hop node that receives the second packet; and sending, by the first intermediate node, the second packet to the next-hop node.

10. The method according to claim 9, wherein the method further comprises:

forwarding, by the first intermediate node, the first packet to the second intermediate node or the ingress node.

11. The method according to claim 9, wherein the first packet is a border gateway protocol (BGP) packet, and the VPN SID is carried in an internet protocol (IP) unicast address family of the BGP packet; or the first packet is an interior gateway protocol (IGP) packet.

12. The method according to claim 9, wherein the storing, by the first intermediate node, the entry comprises:

generating and storing, by the first intermediate node, a first forwarding entry based on the first packet, wherein the first forwarding entry comprises a correspondence between a next-hop node identifier and the VPN SID; and the determining, by the first intermediate node based on matching between the stored entry and the VPN SID in the second packet, a next-hop node that receives the second packet comprises:

determining, by the first intermediate node, the first forwarding entry based on the VPN SID in the second packet; and determining, by the first intermediate node based on the next-hop node identifier in the first forwarding entry, the next-hop node that receives the second packet.

13. The method according to claim 11, wherein the method further comprises:

receiving, by the first intermediate node, a third packet, wherein the third packet does not comprise the VPN SID; and the generating, by the first intermediate node, a first forwarding entry based on the first packet comprises:

determining, by the first intermediate node based on the VPN SID comprised in the first packet, to generate the first forwarding entry prior to a second forwarding entry, wherein the second forwarding entry is a forwarding entry generated based on the third packet.

14. The method according to claim 9, wherein the determining, by the first intermediate node based on matching between the stored entry and the VPN SID in the second packet, a next-hop node that receives the second packet comprises:

determining, by the first intermediate node based on exact matching between the stored entry and the VPN SID in the second packet, the next-hop node that receives the second packet.

15. The method according to claim 9, wherein the first packet further comprises an identifier of a network topology corresponding to the VPN SID, the identifier of the network topology indicates to the first intermediate node to determine a correspondence between the VPN SID, the next-hop node, and the identifier of the network topology, and the next-hop node is a node in the network topology identified by the identifier of the network topology.

16. An apparatus applied in an ingress node, comprising:

a memory storing computer instructions;

a processor coupled to the memory, wherein the computer instructions, when executed by the processor, cause the apparatus to:

receive a first packet sent from an egress node, wherein the first packet comprises a virtual private network segment identifier (VPN SID) corresponding to the egress node;

receive a second packet from a user side, wherein the second packet is a VPN service packet, and add the VPN SID to the second packet to obtain an updated second packet, wherein the VPN SID is used as the destination address of the updated second packet, and wherein the VPN SID indicates to a first intermediate node on a forwarding path of the updated second packet to determine, based on matching between a locally stored entry in the first intermediate node and the VPN SID in the updated second packet, a next-hop node that receives the updated second packet, wherein the locally stored entry comprises a correspondence between the VPN SID and the next-hop node, and wherein the next-hop node is a second intermediate node or the egress node; and send the updated second packet to the first intermediate node.

17. The apparatus according to claim 16, wherein the computer instructions when executed by the processor, further cause the apparatus to:

add the VPN SID to a destination address field of a packet header of the second packet based on a correspondence between the address of the destination device carried in the second packet and the VPN SID.

18. The apparatus according to claim 16, wherein
the first packet is a border gateway protocol (BGP) packet, and the VPN SID is carried in an internet protocol (IP) unicast address family of the BGP packet; or
the first packet is an interior gateway protocol (IGP) packet.

19. The apparatus according to claim 16, wherein the first packet further comprises an address of the destination device, and the computer instructions when executed by the processor, further cause the apparatus to:

generate a first forwarding entry based on the first packet, wherein the first forwarding entry comprises a correspondence between the VPN SID and the address of the destination device.

20. The apparatus according to claim 16, wherein the VPN SID indicates to the first intermediate node to perform exact matching based on the VPN SID in the locally stored entry and the VPN SID in the updated second packet, to determine the second intermediate node or the egress node that receives the updated second packet.

* * * * *